United States Patent
Ko et al.

(10) Patent No.: US 12,232,057 B2
(45) Date of Patent: Feb. 18, 2025

(54) METHOD AND APPARATUS FOR SELECTING CRITERIA FOR SIDELINK SYNCHRONIZATION IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 17/771,765

(22) PCT Filed: Oct. 23, 2020

(86) PCT No.: PCT/KR2020/014569
§ 371 (c)(1),
(2) Date: Apr. 25, 2022

(87) PCT Pub. No.: WO2021/080372
PCT Pub. Date: Apr. 29, 2021

(65) Prior Publication Data
US 2022/0417872 A1    Dec. 29, 2022

Related U.S. Application Data

(60) Provisional application No. 62/932,474, filed on Nov. 7, 2019.

(30) Foreign Application Priority Data

Oct. 23, 2019   (KR) .................. 10-2019-0132417

(51) Int. Cl.
*H04W 56/00*   (2009.01)
*H04W 92/18*   (2009.01)

(52) U.S. Cl.
CPC ............ *H04W 56/00* (2013.01); *H04W 92/18* (2013.01)

(58) Field of Classification Search
CPC .......................... H04W 56/00; H04W 92/18
(Continued)

(56) References Cited

U.S. PATENT DOCUMENTS

2018/0220388 A1* 8/2018 Chae ..................... H04W 76/14
2019/0098589 A1* 3/2019 Chae ................... H04W 56/001
(Continued)

FOREIGN PATENT DOCUMENTS

WO    2019143937    7/2019

OTHER PUBLICATIONS

Mitsubishi Electric, "On synchronization procedures for NR V2X sidelink," 3GPP TSG-RAN WG1 Meeting #98b, R1-1910180, Oct. 2019, 10 pages.
(Continued)

*Primary Examiner* — Nicholas R Taylor
*Assistant Examiner* — Chong G Kim
(74) *Attorney, Agent, or Firm* — LEE, HONG, DEGERMAN, KANG & WAIMEY

(57) ABSTRACT

Proposed is a method for performing wireless communication by a first device. The method may comprise the steps of: receiving a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); selecting any one of the plurality of synchronization sources on the basis of a reference signal received power (RSRP) associated with each of the plurality of S-SSBs and a sidelink synchronization signal (SLSS) ID associated with each of the plurality of S-SSBs; performing synchronization on the basis of the S-SSB associated with the selected synchronization source; and (Continued)

transmitting a PSCCH or PSSCH to a second device on the basis of the synchronization. For example, the SLSS ID associated with each of the plurality of S-SSBs may be a criterion for selecting any one of the plurality of synchronization sources, on the basis of the fact that a RSRP value associated with each of the plurality of S-SSBs is greater than or equal to a minimum RSRP threshold value.

11 Claims, 22 Drawing Sheets

(58) Field of Classification Search
USPC .......................................................... 370/350
See application file for complete search history.

(56) References Cited

U.S. PATENT DOCUMENTS

| 2021/0037493 | A1* | 2/2021 | Gulati | .................. | H04B 17/318 |
| 2021/0051617 | A1* | 2/2021 | Gulati | ............... | H04W 56/0015 |

OTHER PUBLICATIONS

CATT, "Sidelink synchronization mechanism in NR V2X," 3GPP TSG-RAN WG1 Meeting #98bis, R1-1910330, Oct. 2019, 16 pages.

Intel Corporation, "Sidelink Synchronization for NR V2X Communication," 3GPP TSG-RAN WG1 Meeting #98bis, R1-1910651, Oct. 2019, 20 pages.

FutureWei, "Synchronization for sidelink," 3GPP TSG-RAN WG1 Meeting #98bis, R1-1910699, Oct. 2019, 7 pages.

PCT International Application No. PCT/KR2020/014569, International Search Report dated Jan. 22, 2021, 4 pages.

Mitsubishi Electric, "On synchronization procedures for NR V2X sidelink," 3GPP TSG-RAN WG1 Meeting #97, R1-1907025, May 2019, 6 pages.

Huawei, HiSilicon, "Sidelink synchronization mechanisms for NR V2X," 3GPP TSG-RAN WG1 Meeting #98, R1-1908043, Aug. 2019, 18 pages.

Korean Intellectual Property Office Application Serial No. 10-2022-7013633, Office Action dated Aug. 25, 2022, 4 pages.

* cited by examiner

FIG. 4
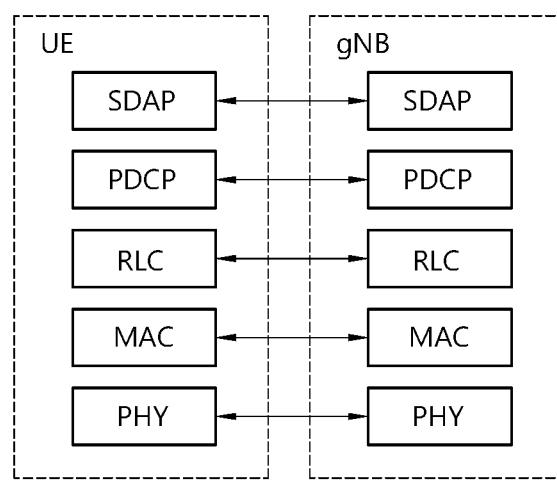
(a)
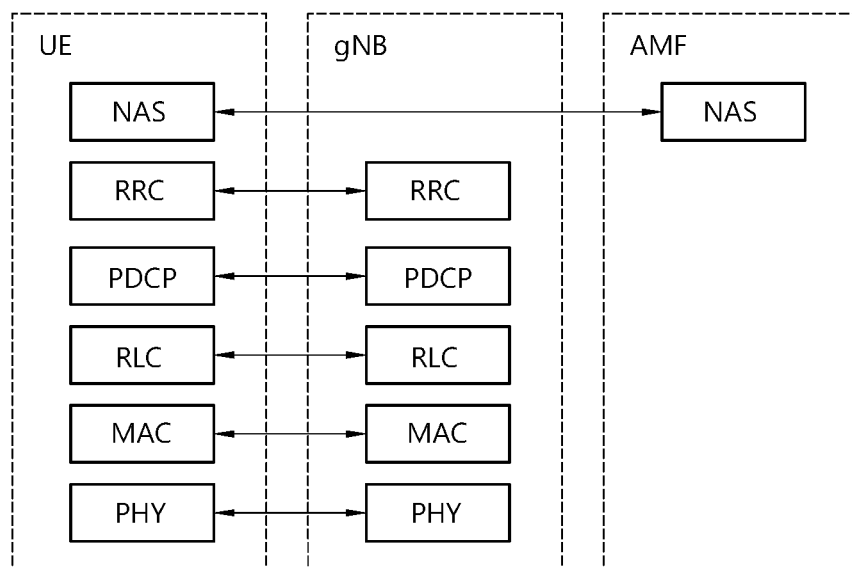
(b)

FIG. 8
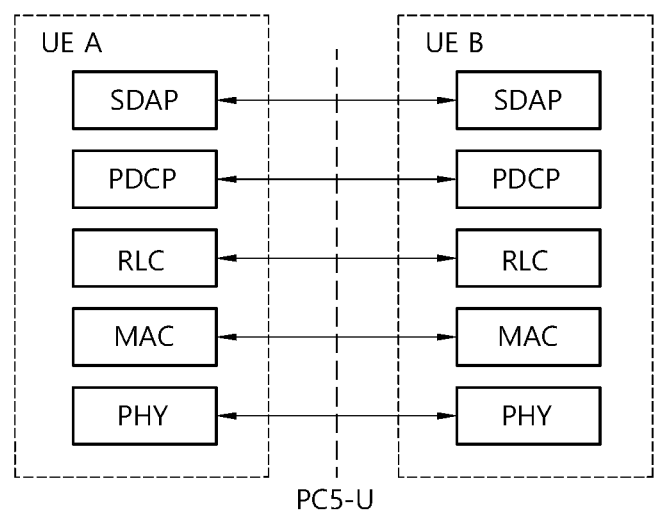
(a)
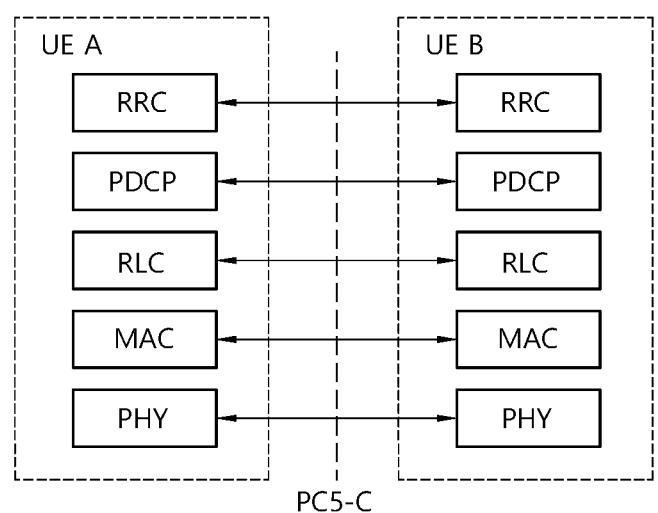
(b)

METHOD AND APPARATUS FOR SELECTING CRITERIA FOR SIDELINK SYNCHRONIZATION IN NR V2X

CROSS-REFERENCE TO RELATED APPLICATIONS

This application is the National Stage filing under 35 U.S.C. 371 of International Application No. PCT/KR2020/014569, filed on Oct. 23, 2020, which claims the benefit of earlier filing date and right of priority to Korean Application No. 10-2019-0132417, filed on Oct. 23, 2019, and claims the benefit of U.S. Provisional Application No. 62/932,474, filed on Nov. 7, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM(Basic Safety Message), CAM(Cooperative Awareness Message), and DENM(Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

On the other hand, when two UEs having the same priority cannot receive a synchronization signal from each other, other UEs located between the two UEs may select only a synchronization signal based on a demodulation reference signal (DM-RS) of a sidelink-synchronization signal block (S-SSB) received from the two UEs. Therefore, for example, since UEs select a UE with a close distance as a reference synchronization, as a result, each of the two UEs forms a sync cluster, it may be difficult to merge two synchronous clusters into one cluster. In this case, since sidelink synchronization between UEs belonging to each synchronization cluster is not matched, a problem in which sidelink communication between UEs becomes impossible may occur.

Technical Solutions

According to an embodiment, a method for a first apparatus to perform wireless communication is proposed. The method may comprise: receiving a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); selecting one synchronization source from among the plurality of synchronization sources, based on reference signal received power (RSRP) related to each of the plurality of S-SSBs and a sidelink synchronization signal (SLSS) ID related to each of the plurality of S-SSBs; performing synchronization based on an S-SSB related to the selected one synchronization source; and transmitting a physical sidelink control channel (PSCCH) or a physical sidelink shared channel (PSSCH) to a second apparatus based on the synchronization. For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold.

EFFECTS OF THE DISCLOSURE

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
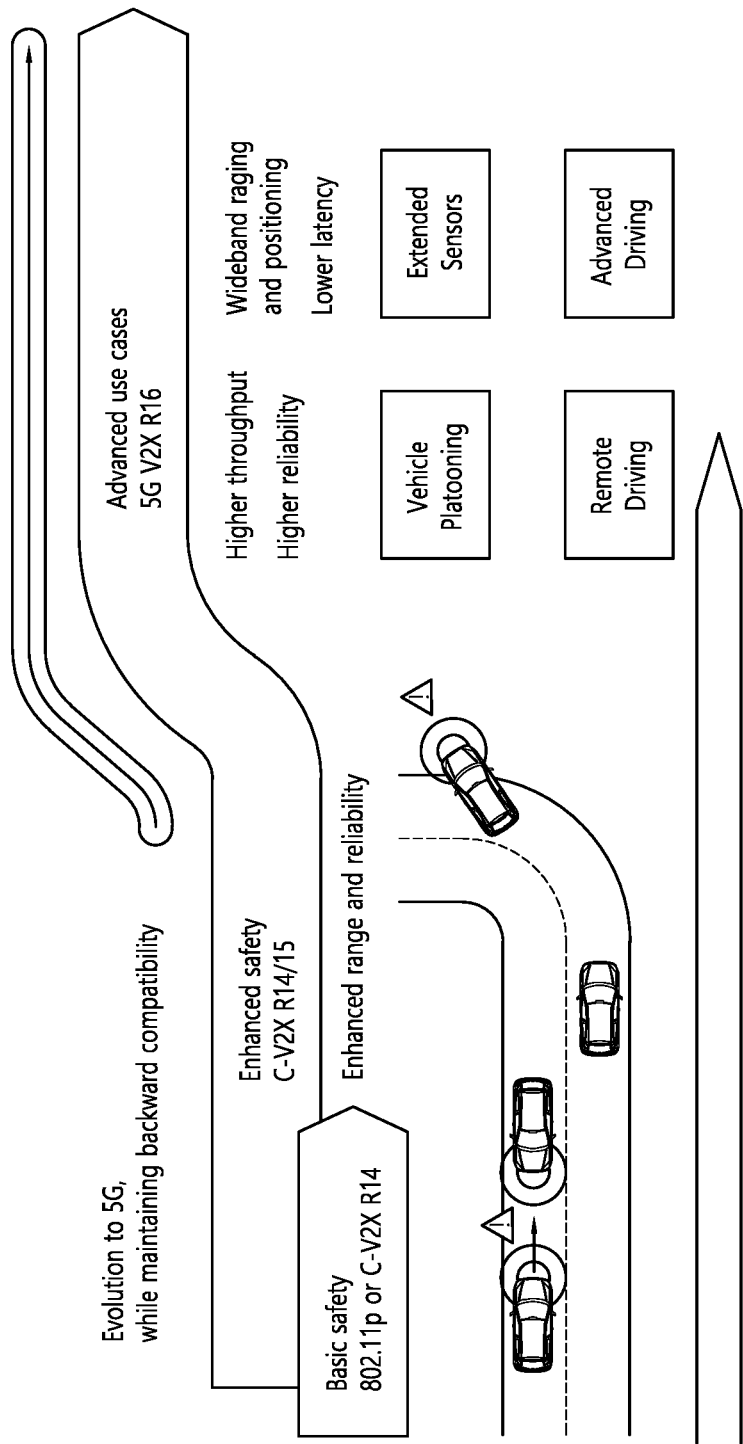
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
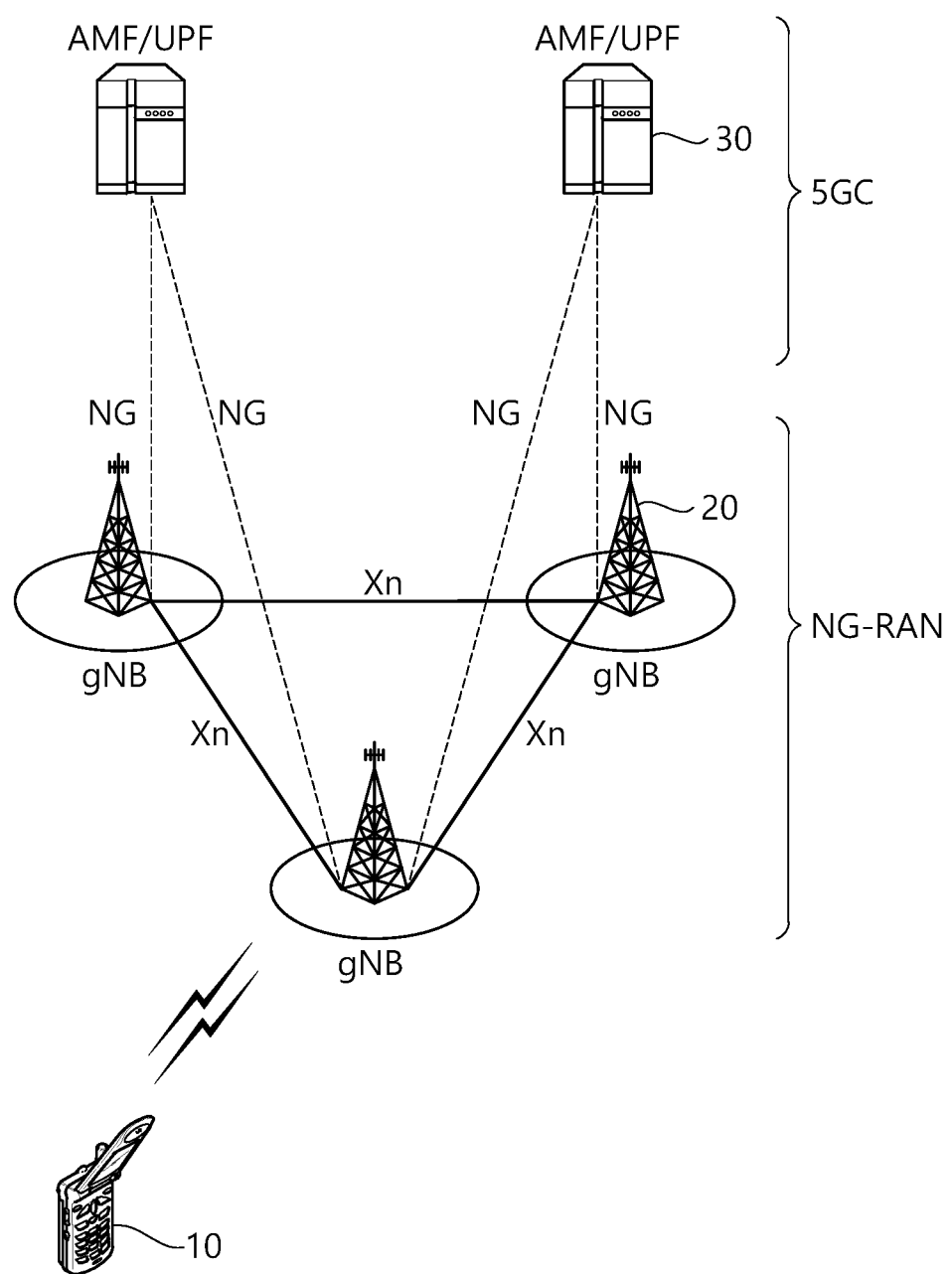
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
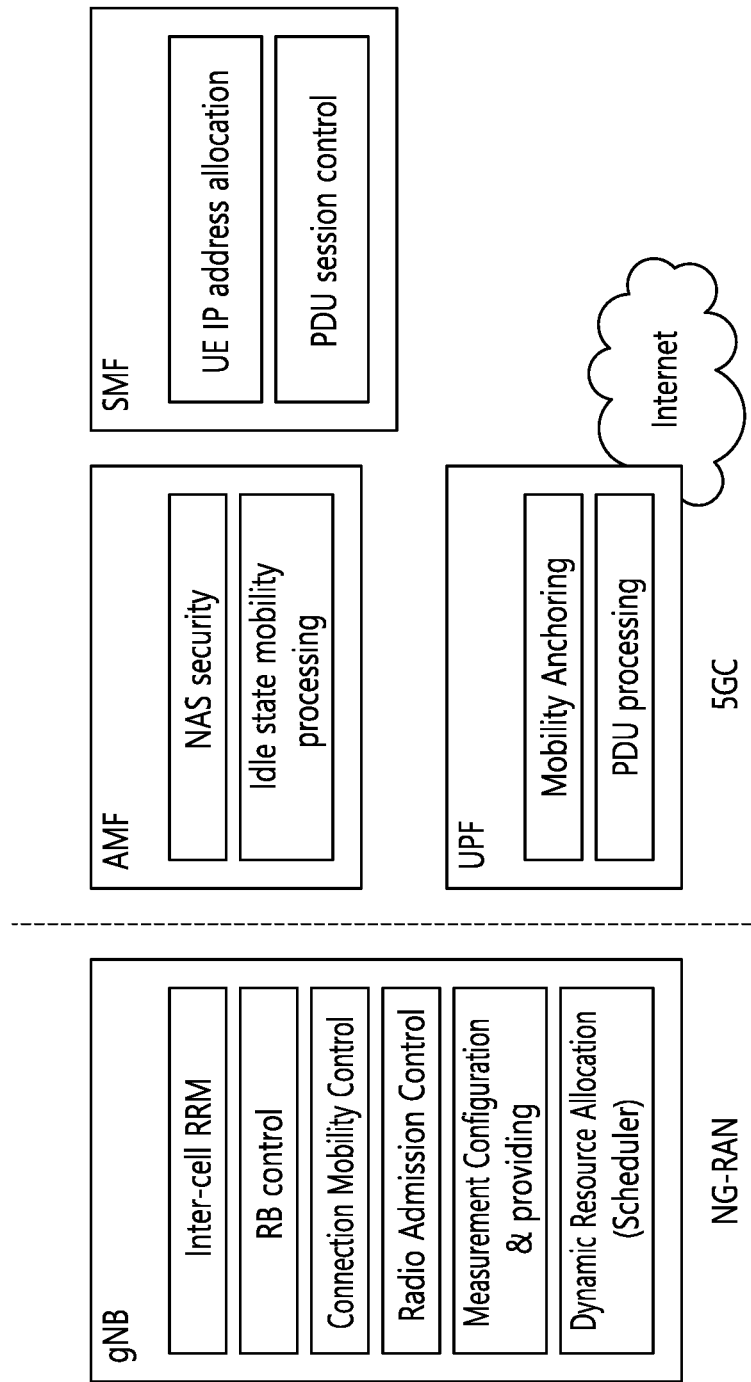
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC CONNECTED state, and, otherwise, the UE may be in an RRC_IDLE state. In case of the NR, an RRC INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
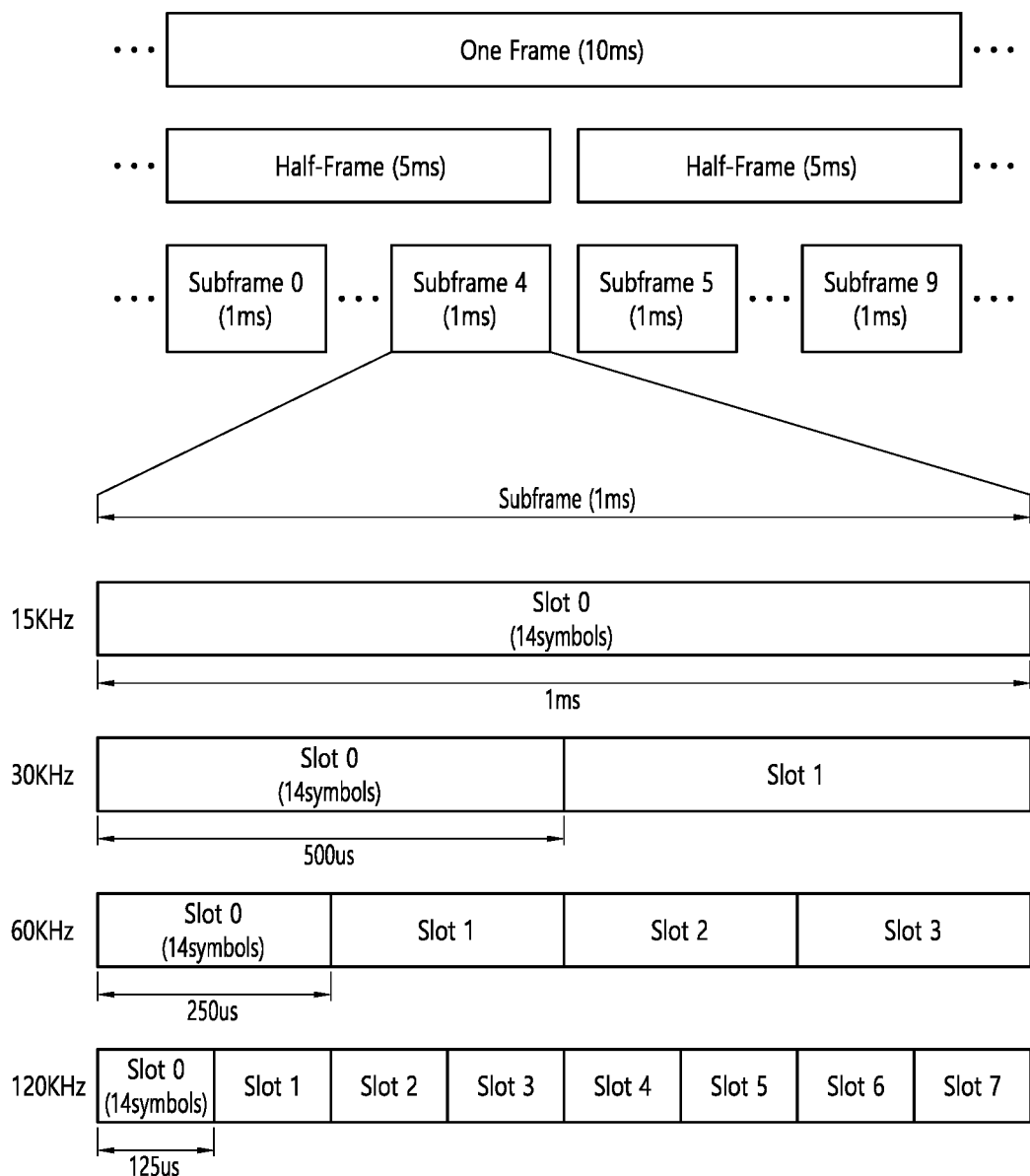
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
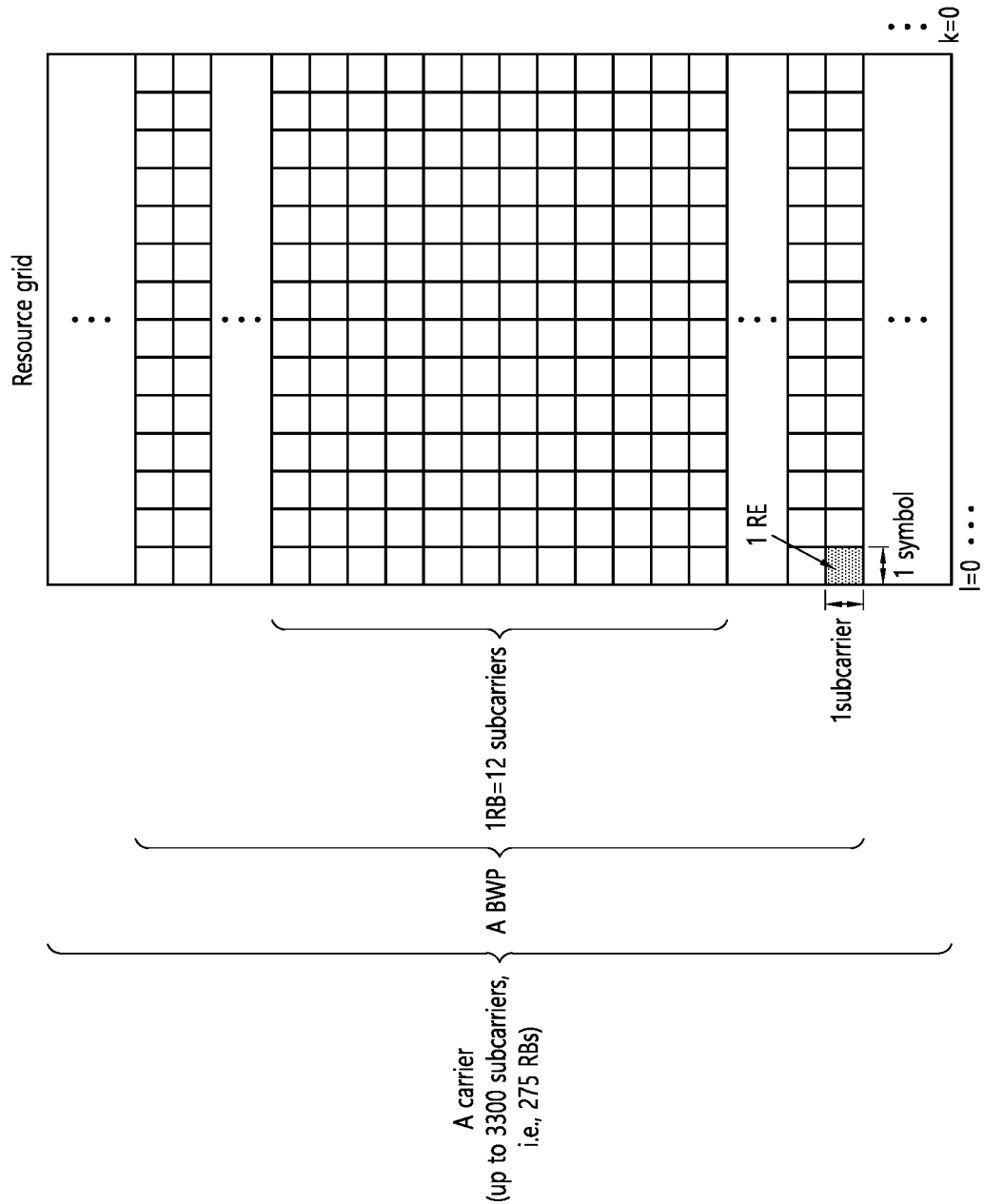
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
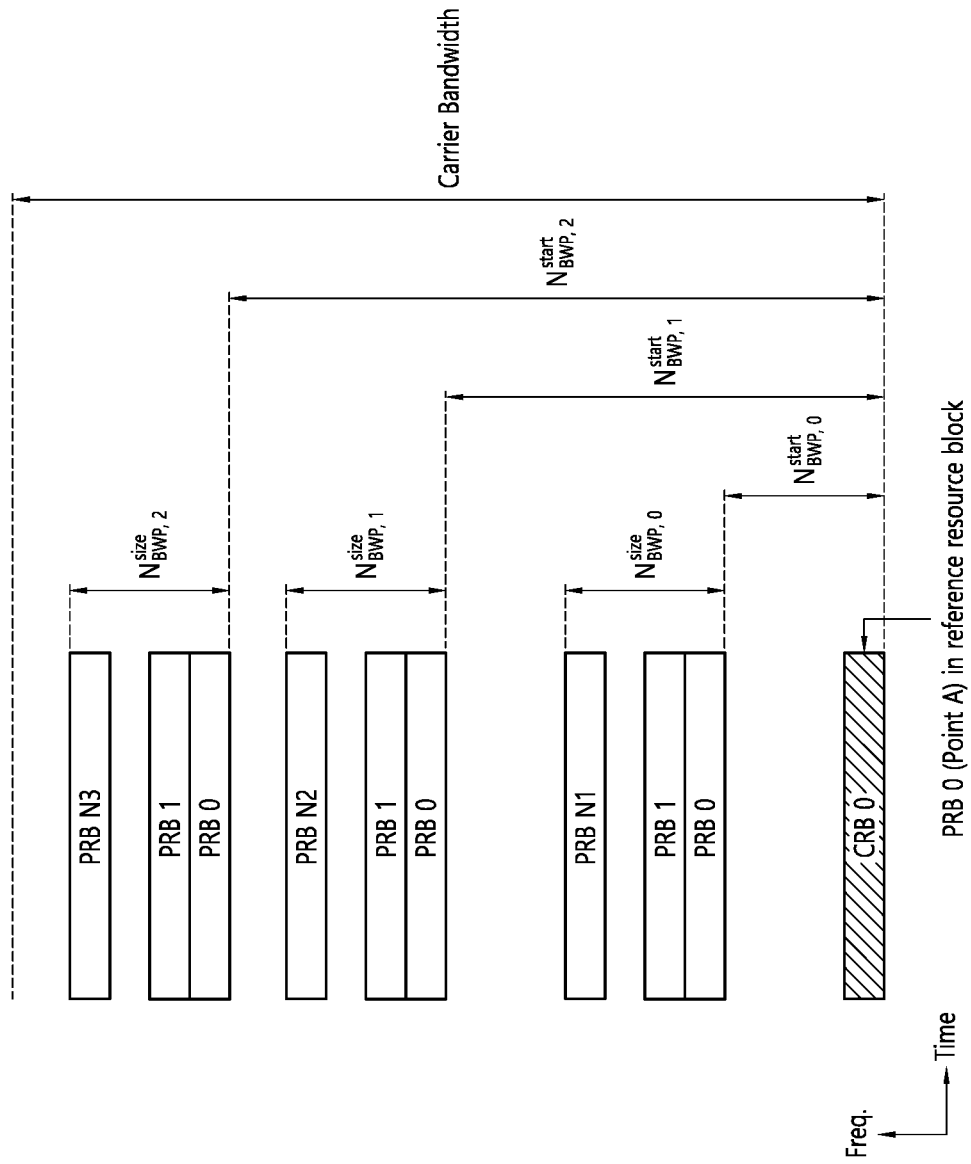
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{start}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
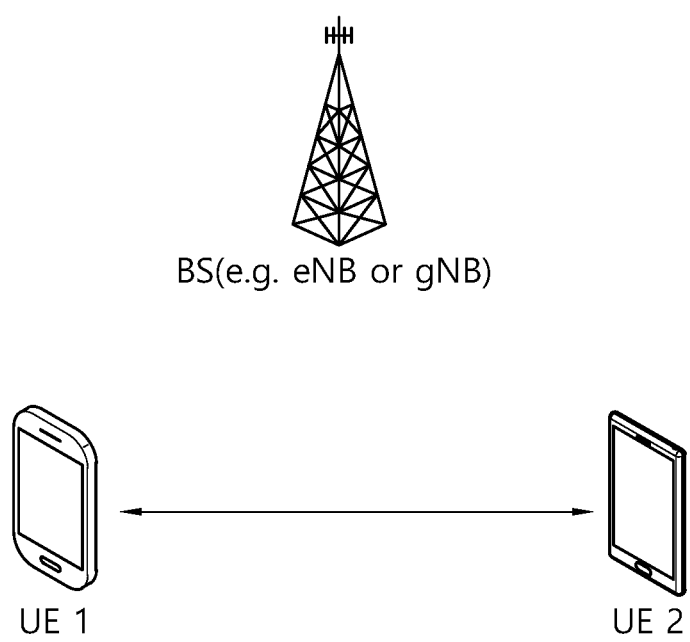
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
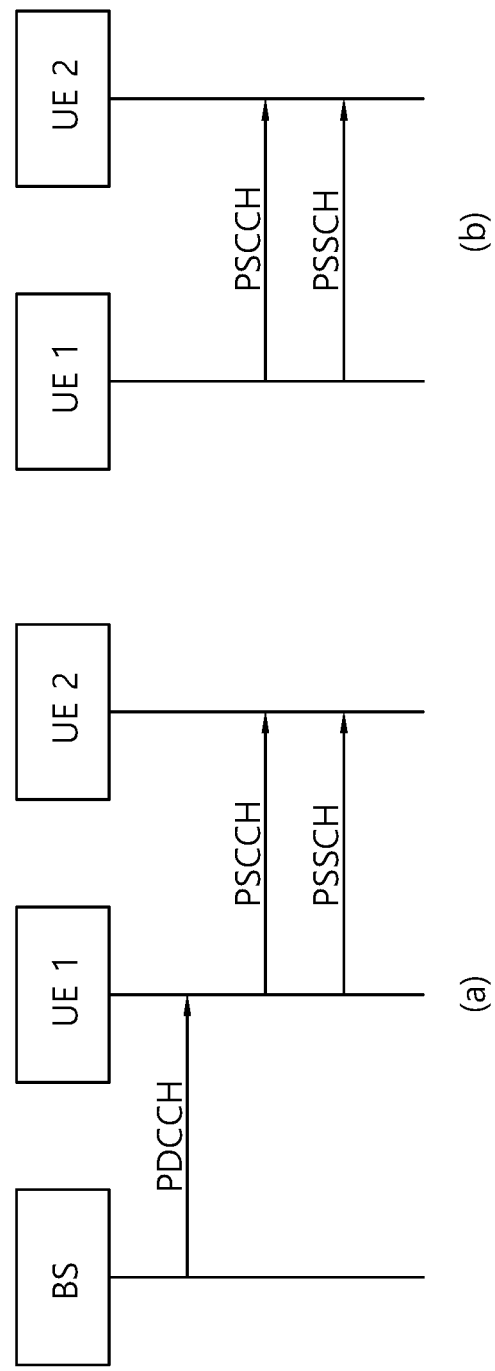
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSCCH.

Figure 11:
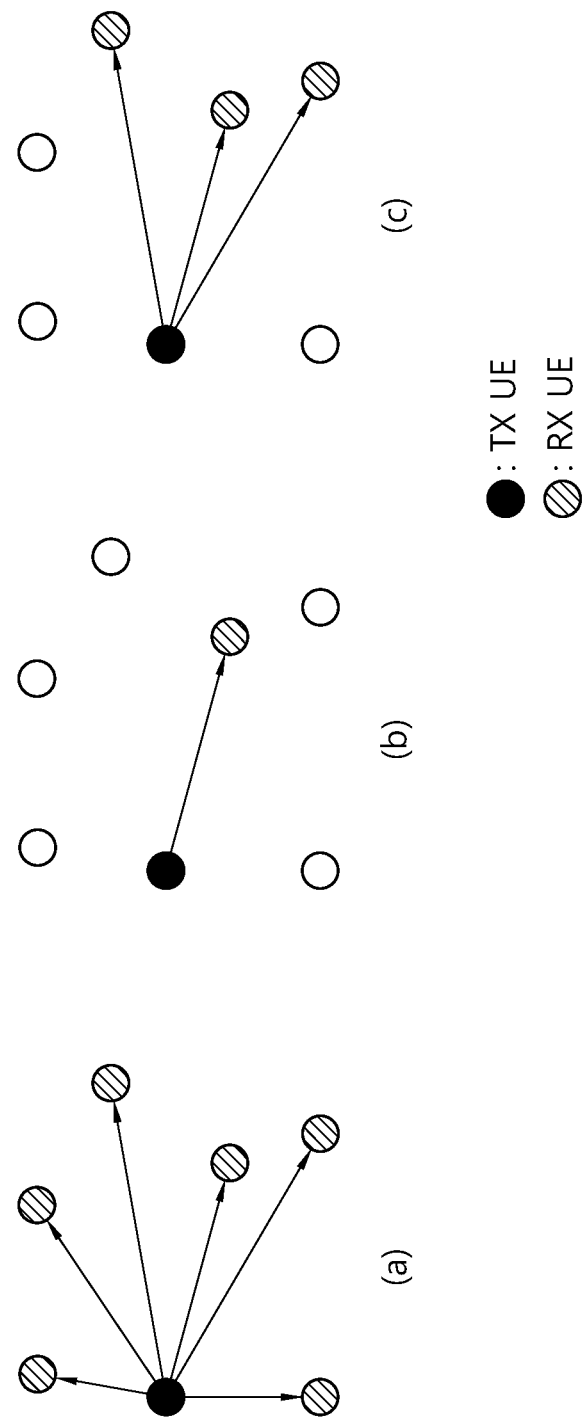
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
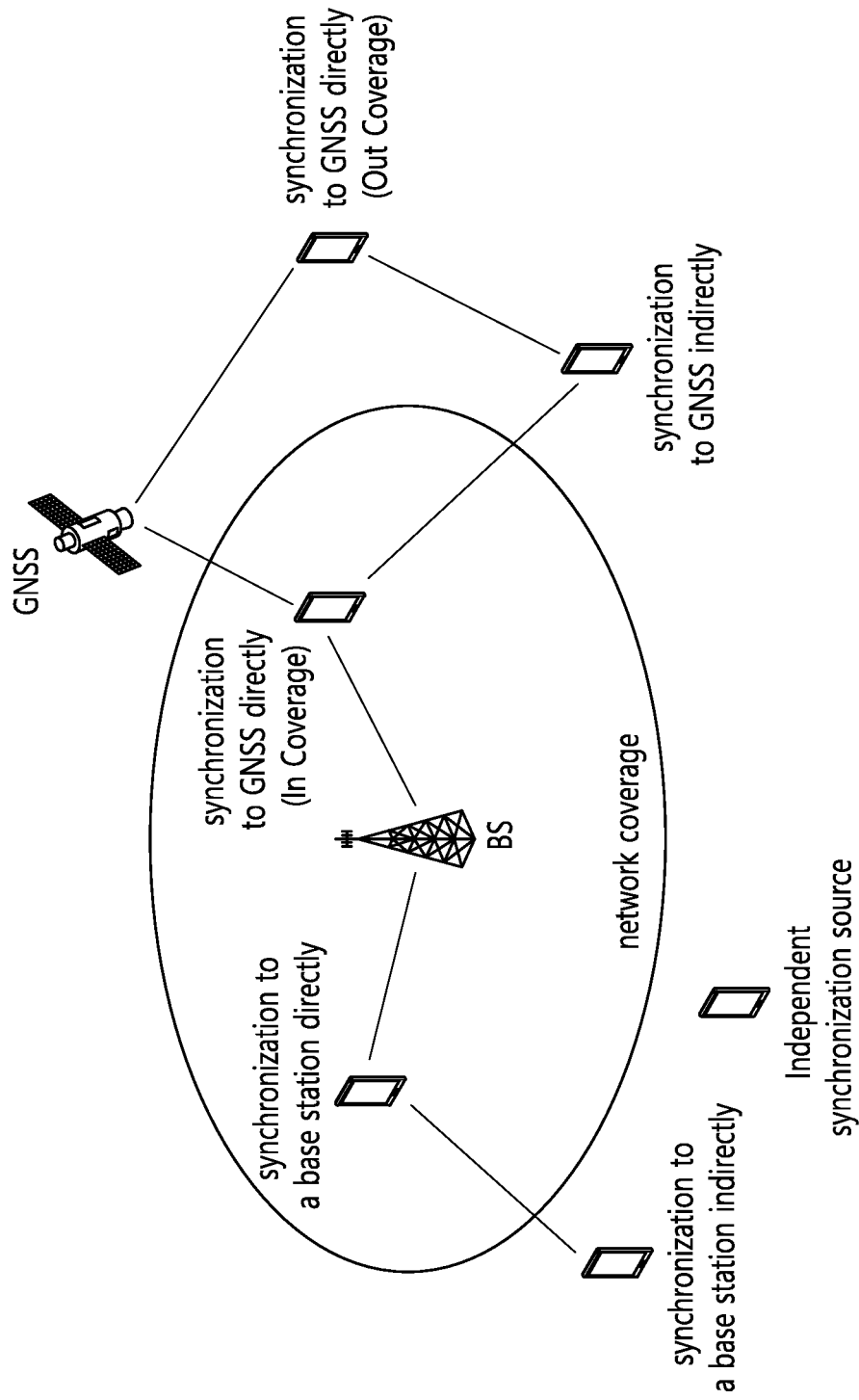
FIG. 12 shows a synchronization source or synchronization reference of V2X, according to an embodiment of the present disclosure.

FIG. 12 shows a synchronization source or synchronization reference of V2X, according to an embodiment of the present disclosure. The embodiment of FIG. 12 may be combined with various embodiments of the present disclosure.

Referring to FIG. 12, in V2X, a UE may be directly synchronized to global navigation satellite system (GNSS), or indirectly synchronized to GNSS through a UE (in network coverage or out of network coverage) synchronized directly to GNSS. When GNSS is configured as a synchronization source, a UE may calculate DFN and subframe number using Coordinated Universal Time (UTC) and a (pre)configured Direct Frame Number (DFN) offset.

Alternatively, a UE may be directly synchronized with a base station or may be synchronized with another UE synchronized with a base station in time/frequency. For example, the base station may be an eNB or a gNB. For example, when a UE is within network coverage, the UE may receive synchronization information provided by a base station and may be directly synchronized with the base station. Thereafter, the UE may provide synchronization information to another adjacent UE. If a base station timing is set as a synchronization reference, for synchronization and downlink measurement, a UE may follow a cell (if within cell coverage at the frequency), a primary cell, or a serving cell (if outside cell coverage at the frequency) related to a corresponding frequency.

A base station (e.g., a serving cell) may provide a synchronization configuration for a carrier used for V2X or SL communication. In this case, a UE may follow a synchronization configuration received from the base station. If a UE does not detect any cell in a carrier used for V2X or SL communication and does not receive a synchronization configuration from a serving cell, the UE may follow a pre-configured synchronization configuration.

Alternatively, a UE may be synchronized with another UE that has not obtained synchronization information directly or indirectly from a base station or GNS S. A synchronization source and preference may be pre-configured in a UE. Alternatively, a synchronization source and preference may be configured through a control message provided by a base station.

The SL synchronization source may be related to a synchronization priority. For example, the relationship between a synchronization source and a synchronization priority may be defined as in Table 5 or Table 6. Table 5 or Table 6 is only an example, and the relationship between a synchronization source and a synchronization priority may be defined in various forms.

TABLE 5

| Priority Level | GNSS-based synchronization | eNB/GNB-based synchronization |
|---|---|---|
| P0 | GNSS | a base station |
| P1 | all UEs synchronized directly to GNSS | all UEs synchronized directly to a base station |
| P2 | all UEs synchronized indirectly to GNSS | all UEs synchronized indirectly to a base station |
| P3 | all other UEs | GNSS |
| P4 | N/A | all UEs synchronized directly to GNSS |
| P5 | N/A | all UEs synchronized indirectly to GNSS |
| P6 | N/A | all other UEs |

TABLE 6

| Priority Level | GNSS-based synchronization | eNB/GNB-based synchronization |
|---|---|---|
| P0 | GNSS | a base station |
| P1 | all UEs synchronized directly to GNSS | all UEs synchronized directly to a base station |
| P2 | all UEs synchronized indirectly to GNSS | all UEs synchronized indirectly to a base station |
| P3 | a base station | GNSS |
| P4 | all UEs synchronized directly to a base station | all UEs synchronized directly to GNSS |
| P5 | all UEs synchronized indirectly to a base station | all UEs synchronized indirectly to GNSS |
| P6 | remaining UE(s) with low priority | remaining UE(s) with low priority |

In Table 5 or Table 6, P0 may mean the highest priority, and P6 may mean the lowest priority. In Table 5 or Table 6, a base station may include at least one of a gNB or an eNB.

Whether to use GNSS-based synchronization or base station-based synchronization may be (pre-)configured. In a single-carrier operation, a UE may derive a transmission timing of the UE from an available synchronization criterion having the highest priority.

Meanwhile, a UE performing sidelink communication may determine a base station (e.g., gNB, eNB), GNSS, a UE performing GNSS-based synchronization, or a UE performing base station-based synchronization as reference synchronization. Alternatively, for example, a UE performing sidelink communication may determine itself as a reference synchronization when there is no synchronization source nearby. When a UE determines an entity such as a base station, GNSS, or UE as a reference synchronization or the UE itself determines a reference synchronization, the UE transmits an S-SSB to surroundings, thereby forming a synchronization cluster using the same reference synchronization. For example, a synchronous cluster may be gradually expanded. In this case, a UE may need a slot/subframe necessary for receiving an S-SSB from surroundings and a slot/subframe necessary for transmitting an S-SSB to surroundings. Since it may be difficult for a UE to transmit/receive simultaneously through resources such as the two types of subframes described above, resources for transmission/reception may have to be separated in a time domain or a frequency domain.

An S-SSB may include an S-PSS signal and an S-SSS signal for initially obtaining synchronization, and a PSBCH for initially transmitting system information. For example, a UE may transmit a demodulation reference signal (DM-RS), which is a reference signal, to decode a payload through a PSBCH. A UE receiving a PSBCH may estimate a transport channel by using a DM-RS, and a UE receiving a PSBCH may decode a payload for the PSBCH.

For example, a synchronization source may include a UE that has directly or indirectly synchronized with a neighboring base station, GNSS, base station, or GNSS, a UE that has synchronized with other UEs, or a UE that has performed reference synchronization by itself because it cannot find a synchronization source nearby. A synchronization source may be defined or pre-configured. For example, a UE may finally determine a reference synchronization signal based on a rule pre-configured by a higher layer. For example, a UE may change an already selected reference synchronization signal to another reference synchronization signal based on a rule pre-configured by a higher layer. For example, a rule for a UE to select a reference synchronization signal may be defined as shown in Table 6 above.

In Table 6, through higher layer signaling, a left column defining GNSS with the highest priority and a right column defining a base station with the highest priority may be configured for a UE to select a reference synch. For example, a priority value from P0 to P6 may be defined for each column. In this case, a smaller number after P may indicate a higher priority. That is, for example, in the left column, a synchronization signal P3 of a base station may have a lower priority than a synchronization signal P1 of a UE directly synchronized with GNSS or a synchronization signal P2 of a UE synchronized with GNSS indirectly. For example, in the left column, a synchronization signal P3 of a base station may have a higher priority than a synchronization signal P4 of a UE directly synchronized with a base station or a synchronization signal P5 of a UE synchronized with a base station indirectly. For example, P6 may represent a UE that performs synchronization with UEs other than those listed in P0 to P5, or generates a synchronization signal by itself without performing synchronization with a nearby synchronization source and transmits it to surroundings.

In order for a UE to select or change a reference synchronization, a UE may select a reference synchronization based on a priority of a synchronization signal, RSRP for S-SSB, or RSRP for PSBCH DM-RS through Table 6. That is, for example, in case that a priority of a new synchronization signal is higher than that of a currently selected reference synchronization signal, RSRP of a new synchronization signal is greater than or equal to a minimum RSRP threshold pre-configured by an upper layer, and a difference value between RSRP of a new synchronization signal and RSRP of a current reference synchronization signal is greater than or equal to a minimum RSRP difference value pre-configured by an upper layer, a UE may select a new synchronizations signal and change a reference synchronization signal from a current reference synchronization signal to the new synchronization signal.

Figure 13:
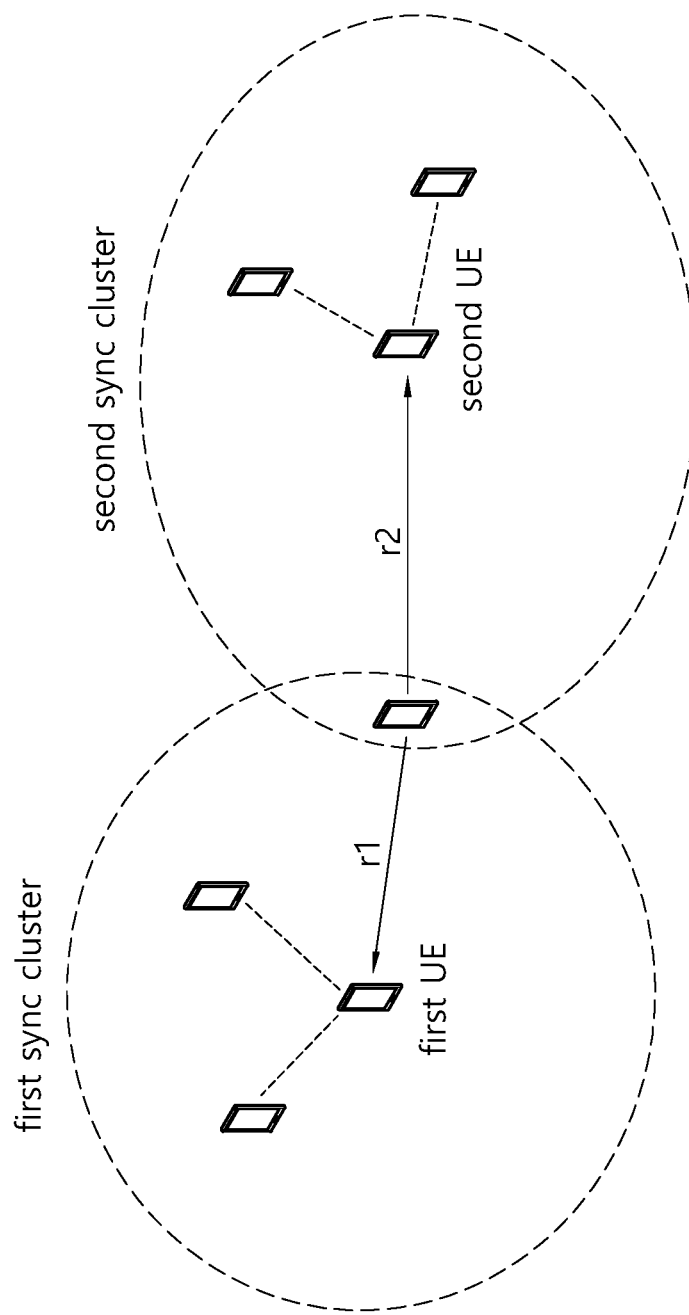
FIG. 13 is a diagram showing a UE for selecting a reference synchronization signal between two UEs having the same priority.

FIG. 13 is a diagram showing a UE for selecting a reference synchronization signal between two UEs having the same priority.

On the other hand, when two UEs having the same priority cannot receive a synchronization signal from each other, UEs located between the two UEs may select a synchronization signal based on a DM-RS of an S-SSB received only from the two UEs. Therefore, for example, since UEs select a UE with a close distance as a reference synchronization, as a result, each of the two UEs forms a sync cluster, it may be difficult to merge two synchronous clusters into one cluster. In this case, since sidelink synchronization between UEs belonging to each synchronization cluster is not matched, a problem in which sidelink communication between UEs becomes impossible may occur.

Referring to FIG. 13, there may be a UE that selects a reference synchronization signal between a first UE and a second UE having the same priority. At this time, when a first UE and a second UE cannot receive a synchronization signal from each other, a UE may select a reference synchronization signal based on a DM-RS of an S-SSB received from a first UE and a second UE. Since the distance r1 between a UE and a first UE is shorter than the distance r2 between the UE and a second UE, the UE may select the first UE, which is a short UE, as a reference synchronization. Accordingly, since a first UE and a second UE form a first synchronization cluster and a second synchronization cluster, respectively, it may be difficult to form the first synchronization cluster and the second synchronization cluster as one synchronization cluster. As a result, since a sidelink synchronization is not matched between a UE belonging to a first synchronization cluster and a UE belonging to a second synchronization cluster, there may be a problem that sidelink communication is impossible between a UE belonging to a first synchronization cluster and a UE belonging to a second synchronization cluster.

In the present disclosure, a method of selecting or changing a sidelink reference synchronization signal is proposed so that synchronization clusters are merged into one or UEs belonging to different synchronization clusters can perform sidelink communication as much as possible. Hereinafter, various embodiments of the present disclosure may relate to selection and change between synchronization sources having the same priority on a table for selection of a reference synchronization signal.

According to an embodiment of the present disclosure, a UE may determine a reference synchronization signal based on an SL-SSID value transmitted by sidelink synchronization signal and in-coverage field or direct sync field transmitted by PSBCH or PSBCH DM-RS. For example, a sidelink synchronization signal may indicate a priority of a synchronization signal constituting Table 6 above. For example, when a UE receives a synchronization signal from two or more synchronization sources, for synchronization sources having the same priority, a UE may select a synchronization source having the smallest SL-SSID value among synchronization sources in which RSRP related to an S-SSB is greater than or equal to a pre-configured threshold value. For example, the pre-configured threshold value may be a value pre-configured by higher layer signaling. For example, the pre-configured threshold may be a minimum RSRP threshold. For example, for synchronization sources having the same priority based on Table 6, a UE may select a synchronization source having the smallest SL-SSID value among synchronization sources in which RSRP related to an S-SSB is greater than or equal to a pre-configured threshold. For example, for synchronization sources having the same priority based on Table 6, a UE may select a synchronization source with the greatest SL-SSID value among synchronization sources in which RSRP related to an S-SSB is greater than or equal to a pre-configured threshold. For example, for synchronization sources having the same priority based on Table 6, a UE may select a synchronization source whose SL-SSID value is included in a pre-configured range, among synchronization sources in which RSRP related to an S-SSB is greater than or equal to a pre-configured threshold. For example, for synchronization sources having the same priority based on Table 6, a UE may select a synchronization source whose SL-SSID value is closest to a pre-configured value, among synchronization sources in which RSRP related to an S-SSB is greater than or equal to a pre-configured threshold.

For example, for synchronization sources with the same priority based on Table 6 above, a UE may select a synchronization source with the smallest SL-SSID value, among synchronization sources whose RSRP related to an S-SSB is greater than or equal to a pre-configured threshold, and among synchronization sources currently selected as a reference synchronization. For example, for synchronization sources with the same priority based on Table 6 above, a UE may select a synchronization source with the greatest SL-SSID value, among synchronization sources whose RSRP related to an S-SSB is greater than or equal to a pre-configured threshold, and among synchronization sources currently selected as a reference synchronization. For example, for synchronization sources with the same priority based on Table 6 above, a UE may select a synchronization source whose SL-SSID value is included in a pre-configured range, among synchronization sources whose RSRP related to an S-SSB is greater than or equal to a pre-configured threshold, and among synchronization sources currently selected as a reference synchronization. For example, for synchronization sources with the same priority based on Table 6 above, a UE may select a synchronization source whose SL-SSID value is closest to a pre-configured value, among synchronization sources whose RSRP related to an S-SSB is greater than or equal to a pre-configured threshold, and among synchronization sources currently selected as a reference synchronization.

According to an embodiment of the present disclosure, based on a table for selecting a synchronization signal (e.g., Table 6), in case that a priority of a synchronization signal is greater than or equal to a pre-configured priority value, a priority of a synchronization signal is less than or equal to a pre-configured priority value, a priority of a synchronization signal is within a pre-configured priority range, or a priority of a synchronization signal is a pre-configured priority value, a UE may select or change a reference synchronization signal based on an SL-SSID. For example, selecting a synchronization source by a UE based on an SL-SSID may include selecting or changing a reference synchronization signal by a UE based on an SL-SSID. For example, since GNSS and a base station are important synchronization sources, various embodiments of the present disclosure may be applied to a synchronization source having a priority of P6 or P6' in a pre-configured table (e.g., Table 6), except for GNSS, a base station, UEs directly or indirectly synchronized to GNSS and UEs directly or indirectly synchronized to a base station.

According to an embodiment of the present disclosure, a method of selecting a synchronization source based on an SL-SSID and a method of selecting a synchronization source based on RSRP may be pre-configured for a UE by higher layer signaling. For example, a UE may apply a configuration related to whether to select a method of selecting a synchronization source based on an SL-SSID and a method of selecting a synchronization source based on RSRP, for a synchronization source with the smallest SL-S SID, among a synchronization source currently selected as a reference synchronization and a plurality of synchronization sources from which a UE receives a synchronization signal. For example, a UE may apply a configuration related to whether to select a method of selecting a synchronization source based on an SL-SSID and a method of selecting a synchronization source based on RSRP, for a synchronization source with the greatest SL-SSID, among a synchronization source currently selected as a reference synchronization and a plurality of synchronization sources from which a UE receives a synchronization signal. For example, a UE may apply a configuration related to whether to select a method of selecting a synchronization source based on an SL-SSID and a method of selecting a synchronization source based on RSRP, for synchronization sources included in a range related to a pre-configured SL-SSID, among a synchronization source currently selected as a reference synchronization and a plurality of synchronization sources from which a UE receives a synchronization signal.

Alternatively, for example, a UE may apply a configuration related to whether to select either a method of selecting a synchronization source based on an SL-SSID or a method of selecting a synchronization source based on RSRP, for synchronization sources in which a priority related to a synchronization source is higher than or equal to a pre-configured priority, among a synchronization source currently selected as a reference synchronization and a plurality of synchronization sources from which the UE receives a synchronization signal. For example, a UE may apply a configuration related to whether to select either a method of selecting a synchronization source based on an SL-SSID or a method of selecting a synchronization source based on RSRP, for synchronization sources in which a priority related to a synchronization source is less than or equal to a pre-configured priority, among a synchronization source currently selected as a reference synchronization and a plurality of synchronization sources from which the UE receives a synchronization signal. For example, a UE may apply a configuration related to whether to select either a method of selecting a synchronization source based on an SL-SSID or a method of selecting a synchronization source based on RSRP, for synchronization sources whose priority related to a synchronization source is within a pre-configured priority range, among a synchronization source currently selected as a reference synchronization and a plurality of synchronization sources from which the UE receives a synchronization signal. For example, a priority related to a synchronization source may be determined based on Table 6 above. For example, a UE may apply a configuration related to whether to select either a method of selecting a synchronization source based on an SL-SSID or a method of selecting a synchronization source based on RSRP, for synchronization sources whose priority related to a synchronization source is P6 or P6' in Table 6 above, among a synchronization source currently selected as a reference synchronization and a plurality of synchronization sources from which the UE receives a synchronization signal.

According to an embodiment of the present disclosure, in case of at least one of a case in which RSRP related to a plurality of synchronization sources from which a UE has received a synchronization signal is greater than or equal to a pre-configured threshold, or a case in which RSRP difference value between multiple synchronization sources is greater than or equal to a pre-configured threshold, a UE may apply a method of selecting a synchronization source based on an SL-SSID. For example, a pre-configured threshold value may be configured for a UE by higher layer signaling.

For example, a UE may select a synchronization source based on an SL-SSID, for synchronization sources in which an RSRP difference value related to a synchronization source between any two synchronization sources is greater than or equal to a pre-configured first threshold, and an RSRP difference value related to a synchronization source between any two synchronization sources is less than or equal to a pre-configured second threshold value, among a synchronization source currently selected as a reference synchronization and a plurality of synchronization sources from which a UE receives a synchronization signal. For example, a UE may select a synchronization source based on RSRP, for synchronization sources in which an RSRP difference value related to a synchronization source between any two synchronization sources is less than a pre-configured first threshold, or an RSRP difference value related to a synchronization source between any two synchronization sources is greater than a pre-configured second threshold value, among a synchronization source currently selected as a reference synchronization and a plurality of synchronization sources from which a UE receives a synchronization signal. For example, a pre-configured first threshold value and a pre-configured second threshold value may be configured for a UE by higher layer signaling.

Alternatively, for example, a UE may select a synchronization source based on RSRP for synchronization sources in which an RSRP difference value related to a synchronization source between any two synchronization sources is greater than or equal to a pre-configured first threshold, and an RSRP difference value related to a synchronization source between any two synchronization sources is less than or equal to a pre-configured second threshold value, among a synchronization source currently selected as a reference synchronization and a plurality of synchronization sources from which a UE receives a synchronization signal. For example, a UE may select a synchronization source based on an SL-SSID, for synchronization sources in which an RSRP difference value related to a synchronization source between any two synchronization sources is less than a pre-configured first threshold, or an RSRP difference value related to a synchronization source between any two synchronization sources is greater than a pre-configured second threshold value, among a synchronization source currently selected as a reference synchronization and a plurality of synchronization sources from which a UE receives a synchronization signal. For example, a pre-configured first threshold value and a pre-configured second threshold value may be configured for a UE by higher layer signaling.

According to an embodiment of the present disclosure, a UE may not change a synchronization source, for synchronization sources in which an RSRP difference value related to a synchronization source between any two synchronization sources is greater than or equal to a pre-configured threshold, and an RSRP difference value related to a synchronization source between any two synchronization sources is maintained longer than a pre-configured time, among a synchronization source currently selected as a reference synchronization and a plurality of synchronization sources from which a UE receives a synchronization signal. For example, a UE may apply a method of selecting a synchronization source based on RSRP or a method of selecting a synchronization source based on SL-SSID, for synchronization sources in which an RSRP difference value related to a synchronization source between any two synchronization sources is greater than or equal to a pre-configured threshold, and an RSRP difference value related to a synchronization source between any two synchronization sources is maintained shorter than a pre-configured time, among a synchronization source currently selected as a reference synchronization and a plurality of synchronization sources from which a UE receives a synchronization signal.

Alternatively, for example, for an synchronization source with the smallest SL-SSID among a synchronization source currently selected as a reference synchronization and a plurality of synchronization sources from which a UE has received a synchronization signal, when RSRP related to the synchronization source is greater than or equal to a pre-configured threshold, and RSRP related to the synchronization source is maintained for more than a pre-configured time, a UE may select a synchronization source based on an SL-SSID. For example, for an synchronization source with the greatest SL-SSID among a synchronization source currently selected as a reference synchronization and a plurality of synchronization sources from which a UE has received a synchronization signal, when RSRP related to the synchronization source is greater than or equal to a pre-configured threshold, and RSRP related to the synchronization source is maintained for more than a pre-configured time, a UE may select a synchronization source based on an SL-SSID. For example, for synchronization sources whose SL-SSID is within a pre-configured range among a synchronization source currently selected as a reference synchronization and a plurality of synchronization sources from which a UE has received a synchronization signal, when RSRP related to the synchronization sources is greater than or equal to a pre-configured threshold, and RSRP related to the synchronization sources is maintained for more than a pre-configured time, a UE may select a synchronization source based on an SL-SSID.

For example, for an synchronization source with the smallest SL-SSID among a synchronization source currently selected as a reference synchronization and a plurality of synchronization sources from which a UE has received a synchronization signal, when RSRP related to the synchronization source is less than a pre-configured threshold, or when RSRP related to the synchronization source is greater than or equal to the pre-configured threshold and remains shorter than a pre-configured time, a UE may select a synchronization source based on RSRP. For example, for an synchronization source with the greatest SL-S SID among a synchronization source currently selected as a reference synchronization and a plurality of synchronization sources from which a UE has received a synchronization signal, when RSRP related to the synchronization source is less than a pre-configured threshold, or when RSRP related to the synchronization source is greater than or equal to the pre-configured threshold and remains shorter than a pre-configured time, a UE may select a synchronization source based on RSRP. For example, for synchronization sources whose SL-SSID is within a pre-configured range among a synchronization source currently selected as a reference synchronization and a plurality of synchronization sources from which a UE has received a synchronization signal, when RSRP related to the synchronization sources is less than a pre-configured threshold, or when RSRP related to the synchronization sources is greater than or equal to the pre-configured threshold and remains shorter than a pre-configured time, a UE may select a synchronization source based on RSRP.

According to an embodiment of the present disclosure, a UE may select a synchronization source based on an SL-SSID, for synchronization sources in which an SL-SSID difference value related to a synchronization source between any two synchronization sources is greater than or equal to a pre-configured threshold, among a synchronization source currently selected as a reference synchronization and a plurality of synchronization sources from which a UE receives a synchronization signal. For example, a UE may select a synchronization source based on RSRP, for synchronization sources in which an SL-SSID difference value related to a synchronization source between any two synchronization sources is less than a pre-configured threshold, among a synchronization source currently selected as a reference synchronization and a plurality of synchronization sources from which a UE receives a synchronization signal.

Alternatively, a UE may select a synchronization source based on an SL-SSID, for synchronization sources whose SL-SSID difference value related to a synchronization source between any two synchronization sources is less than or equal to a pre-configured threshold, among a synchronization source currently selected as a reference synchronization and a plurality of synchronization sources from which a UE receives a synchronization signal. For example, a UE may select a synchronization source based on RSRP, for synchronization sources whose SL-SSID difference value related to a synchronization source between any two synchronization sources exceeds a pre-configured threshold, among a synchronization source currently selected as a reference synchronization and a plurality of synchronization sources from which a UE receives a synchronization signal.

For example, a configuration related to whether to select a method of selecting a synchronization source based on an SL-SSID and a method of selecting a synchronization source based on RSRP may be transmitted to a UE by higher layer signaling for synchronization sources whose SL-SSID difference value related to a synchronization source between any two synchronization sources exceeds a pre-configured threshold, among a synchronization source currently selected as a reference synchronization and a plurality of synchronization sources from which a UE receives a synchronization signal.

Meanwhile, in the case of a UE selecting a synchronization source having a priority of P6 or P6' in Table 6 as a reference synchronization, a UE indirectly synchronized with GNSS for selecting or reselecting a synchronization source (e.g., a UE that selects a synchronization signal of a UE directly synchronized with GNSS as a reference synchronization signal) or a UE synchronized with a UE indirectly synchronized with GNSS may exist in the vicinity of the UE.

According to an embodiment of the present disclosure, in a sidelink communication system using a total of 672 SL-SSIDs, a sidelink synchronization procedure may be classified as follows based on an SL-SSID and in-coverage fields.

For example, when a UE (#hop=1) synchronized directly to GNSS uses two synchronization resources, SL-SSID=O, in-coverage field =1, and the UE may transmit through a first or second synchronization resource. Or, when a UE directly synchronized to GNSS (#hop=1) uses three synchronization resources, SL-SSID=0, in-coverage field=0, and the UE may transmit through a third synchronization resource.

For example, if a UE (#hop=2) indirectly synchronized to GNSS uses two synchronization resources, SL-SSID=0, in-coverage field=0, and the UE may transmit through a first or second synchronization resource. Or, when a UE (#hop=2) indirectly synchronized to GNSS uses three synchronization resources, SL-SSID=337, in-coverage field=0, and the UE may transmit through a first or second synchronization resource.

For example, when a UE (e.g., UE of P6 or P6') (#hop>2) synchronized to GNSS by multi-hop uses two synchronization resources, SL-SSID=336, in-coverage field=0, and the UE may transmit through a first or second synchronization resource. Or, when a UE (e.g., UE of P6 or P6') (#hop>2) synchronized to GNSS by multi-hop uses three synchronization resources, SL-SSID=337, in-coverage field=0, and the UE may transmit through a first or second synchronization resource.

According to an embodiment of the present disclosure, cases in which SL-SSID is 337 may include a case that a UE (#hop=2) that is indirectly synchronized to GNSS uses three synchronization resources, other than a case that a multi-hop (multi-hop) GNSS-synchronized UE (e.g., a UE of P6 or P6') uses three synchronization resources. That is, cases in which an SL-SSID is 337 may include a case in which a priority of a synchronization source is higher than P6 or P6'. In this case, a UE may select (e.g., select or change a reference synchronization signal based on an SL-SSID) a synchronization source for a synchronization source in which an SL-SSID is {336, 338, . . . , 671}, based on an SL-SSID. For example, when a synchronization source with an SL-SSID of 336 and a synchronization source with an SL-SSID of 337 coexist in the vicinity of a UE, a UE may select a synchronization source based on RSRP, or select a synchronization source based on an SL-SSID.

Alternatively, for example, when a synchronization source with an SL-SSID of 336 and a synchronization source with an SL-SSID of 337 coexist in the vicinity of a UE, a UE may consider SL-SSIDs of the two synchronization sources as 336. That is, since both synchronization sources transmit synchronization signals based on GNSS, a UE may determine SL-SSIDs of the two synchronization sources as 336 and select a synchronization source based on an SL-SSID.

For example, among synchronization sources having a priority of P6 or P6', a UE transmitting a synchronization signal based on GNSS may exist. In this case, among synchronization sources of P6 or P6', for a GNSS-based synchronization source and a non-GNSS-based synchronization source, a UE may apply different criteria for selecting a synchronization source as SL-SSID or RSRP.

According to an embodiment of the present disclosure, for a GNSS-based synchronization source among synchronization sources of P6 or P6', a UE may select a synchronization source based on RSRP. For example, for a non-GNSS-based synchronization source (hereinafter, non-GNSS-based synchronization source) among synchronization sources of P6 or P6', a UE may select a synchronization source based on an SL-SSID. In this case, when a GNSS-based synchronization source and a non-GNSS-based synchronization source coexist in the vicinity, a UE may select a synchronization source as follows.

1) When a GNSS-based synchronization source and a non-GNSS-based synchronization source coexist in the vicinity of a UE, a UE may select a synchronization source based on RSRP.

2) When a GNSS-based synchronization source and a non-GNSS-based synchronization source coexist in the vicinity of a UE, a UE may select a synchronization source based on an SL-SSID.

3) When a GNSS-based synchronization source and a non-GNSS-based synchronization source coexist in the vicinity of a UE, a UE may select a representative GNSS-based synchronization source based on RSRP for GNSS-based synchronization sources, after selecting a representative non-GNSS-based synchronization source based on an SL-SSID for non-GNSS-based synchronization sources, a UE may select either a representative GNSS-based synchronization source or a representative non-GNSS-based synchronization source based on RSRP.

4) When a GNSS-based synchronization source and a non-GNSS-based synchronization source coexist in the vicinity of a UE, a UE may select a representative GNSS-based synchronization source based on RSRP for GNSS-based synchronization sources, after selecting a representative non-GNSS-based synchronization source based on an SL-SSID for non-GNSS-based synchronization sources, a UE may select either a representative GNSS-based synchronization source or a representative non-GNSS-based synchronization source based on an SL-SSID.

5) When a GNSS-based synchronization source and a non-GNSS-based synchronization source coexist in the vicinity of a UE, in order to form a GNSS-based synchronization cluster, a UE may select a synchronization source based on an SL-SSID among GNSS-based synchronization sources.

For example, in operations of 1) to 4) described above, whether to select an RSRP-based synchronization source or an SL-SSID-based synchronization source may be pre-configured for a UE by higher layer signaling.

For example, in operations of 1) to 4) described above, a UE may determine whether to select an RSRP-based synchronization source or an SL-SSID-based synchronization source.

According to various embodiments of the present disclosure, when a UE selects a sidelink synchronization source, the same synchronization cluster may be created and sidelink communication may be performed between different UEs. In addition, a UE can minimize the degradation of sidelink communication performance due to a frequent change of a reference synchronization signal.

Figure 14:
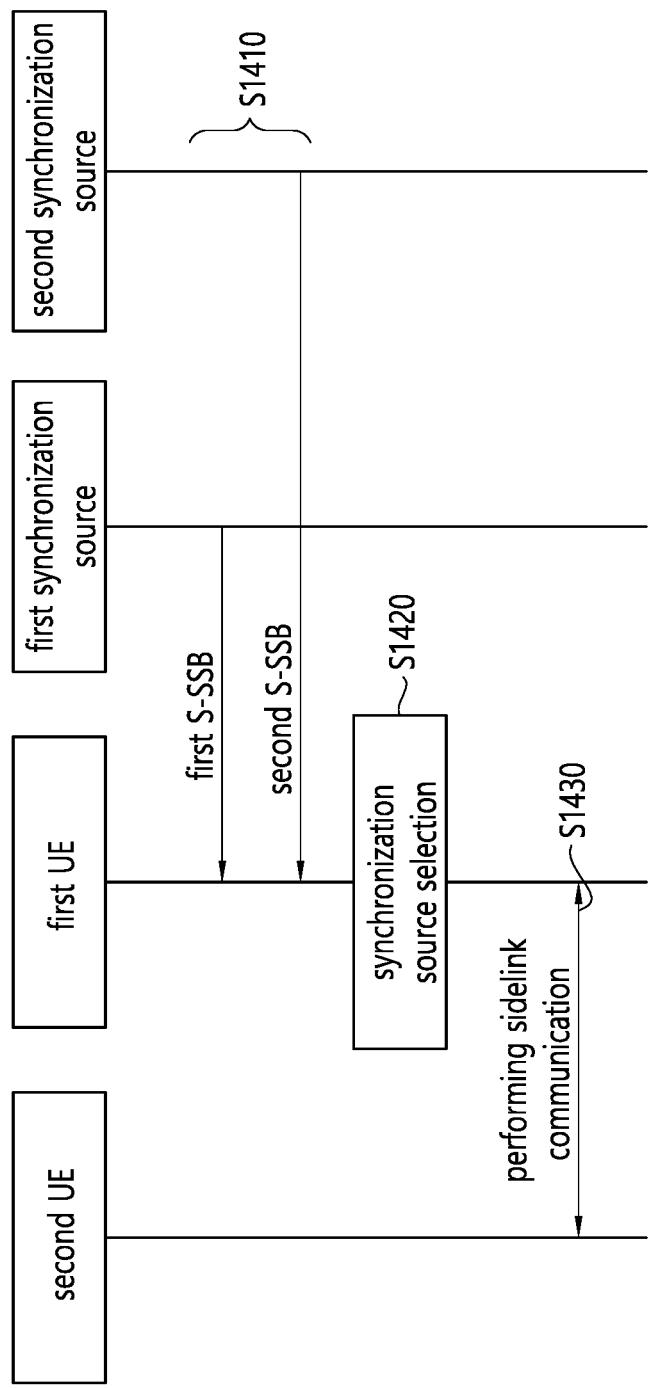
FIG. 14 is a diagram showing a procedure in which a first UE selects a synchronization source and performs sidelink communication with a second UE based on the selected synchronization source, according to an embodiment of the present disclosure.

FIG. 14 is a diagram showing a procedure in which a first UE selects a synchronization source and performs sidelink communication with a second UE based on the selected synchronization source, according to an embodiment of the present disclosure. The embodiment of FIG. 14 may be combined with various embodiments of the present disclosure.

Referring to FIG. 14, in step S1410, a first UE may receive a first S-SSB from a first synchronization source and receive a second S-SSB from a second synchronization source. For example, a first S-SSB may include a first S-PSS, a first S-SSS, and a first PSBCH. For example, a second S-SSB may include a second S-PSS, a second S-SSS and a second PSBCH. For example, a first synchronization source and a second synchronization source may be at least one of GNSS, a base station, or a UE.

In step S1420, a first UE may select either a first synchronization source or a second synchronization source as a synchronization source. For example, a first UE may select one of a current reference synchronization, a first synchronization source, or a second synchronization source as a synchronization source.

For example, when the difference between an RSRP value related to a first S-SSB and an RSRP value related to a second S-SSB is greater than or equal to a first threshold, a first UE may determine RSRP related to an S-SSB as a criterion for selecting a synchronization source. For example, a first threshold value may be pre-configured by higher layer signaling. A first UE may compare an RSRP value related to a first S-SSB and an RSRP value related to a second S-SSB, based on that the difference between an RSRP value related to a first S-SSB and an RSRP value related to a second S-SSB is greater than or equal to a first threshold. In this case, for example, a first UE may select a synchronization source having a greater RSRP value.

For example, when the difference between an RSRP value related to a first S-SSB and an RSRP value related to a second S-SSB is less than a first threshold, a first UE may determine an SLSS-ID related to an S-SSB as a criterion for selecting a synchronization source. For example, a first threshold value may be pre-configured by higher layer signaling. A first UE may compare an SLSS ID value related to a first S-SSB with an SLSS ID value related to a second S-SSB based on that the difference between an RSRP value related to a first S-SSB and an RSRP value related to a second S-SSB is less than a first threshold. In this case, for example, a first UE may select a synchronization source having a smaller SLSS ID value. For example, a first UE may select a synchronization source having a greater SLSS ID value. For example, a first UE may select a synchronization source in which an SLSS ID value is closer to a pre-configured value.

For example, in case where a priority related to a first synchronization source and a priority related to a second synchronization source are the same, and an RSRP value related to a first S-SSB and an RSRP value related to a second S-SSB are greater than or equal to a minimum RSRP threshold, a first UE may determine an SLSS-ID related to an S-SSB as a criterion for selecting a synchronization source. For example, a minimum RSRP threshold may be pre-configured by higher layer signaling. A first UE may compare an SLSS ID value related to a first S-SSB with an SLSS ID value related to a second S-SSB, based on that an RSRP value related to a first S-SSB and an RSRP value related to a second S-SSB are greater than or equal to a minimum RSRP threshold. In this case, for example, a first UE may select a synchronization source having a smaller SLSS ID value. For example, a first UE may select a synchronization source having a greater SLSS ID value. For example, a first UE may select a synchronization source in which an SLSS ID value is closer to a pre-configured value.

For example, a first UE may determine an SLSS-ID related to an S-SSB as a criterion for selecting a synchronization source based on that a priority related to a first synchronization source and a priority related to a second synchronization source are equal to or less than a pre-configured priority. For example, a pre-configured priority may be pre-configured by higher layer signaling. A first UE may compare an SLSS ID value related to a first S-SSB with an SLSS ID value related to a second S-SSB based on that a priority related to a first synchronization source and a priority related to a second synchronization source are equal to or less than a pre-configured priority. In this case, for example, a first UE may select a synchronization source having a smaller SLSS ID value. For example, a first UE may select a synchronization source having a greater SLSS ID value. For example, a first UE may select a synchronization source in which an SLSS ID value is closer to a pre-configured value.

For example, a first UE may determine RSRP related to an S-SSB as a criterion for selecting a synchronization source based on that a priority related to a first synchronization source and a priority related to a second synchronization source are greater than a pre-configured priority. For example, a pre-configured priority may be pre-configured by higher layer signaling. A first UE may compare an RSRP value related to a first S-SSB and an RSRP value related to a second S-SSB based on that a priority related to a first synchronization source and a priority related to a second synchronization source are greater than a pre-configured priority. In this case, for example, a first UE may select a synchronization source having a greater RSRP value.

For example, either an SLSS ID related to an S-SSB or RSRP related to an S-SSB may be pre-configured for a first UE as a criterion for selecting a synchronization source by higher layer signaling.

For example, a first UE may determine an SLSS-ID related to an S-SSB as a criterion for selecting a synchronization source, based on that a difference between a RSRP value related to a first S-SSB and a RSRP value related to a second S-SSB is less than a first threshold, and that a difference between a RSRP value related to a first S-SSB and a RSRP value related to a second S-SSB remains shorter than a pre-configured time.

For example, a first UE may determine RSRP related to an S-SSB as a criterion for selecting a synchronization source, based on that a difference between an RSRP value related to a first S-SSB and an RSRP value related to a second S-SSB is greater than or equal to a first threshold, or that a difference between an RSRP value related to a first S-SSB and an RSRP value related to a second S-SSB remains longer than a pre-configured time.

For example, a first UE may determine an SLSS-ID related to an S-SSB as a criterion for selecting a synchronization source, based on that a difference between an RSRP value related to a first S-SSB and an RSRP value related to a second S-SSB is greater than or equal to a second threshold, For example, a criterion for selecting a synchronization source may be determined by either RSRP related to each of the plurality of S-SSBs or an SLSS ID related to each of a plurality of S-SSBs, based on whether a priority related to synchronization source selection has a priority related to GNSS.

For example, a first UE may determine an SLSS-ID related to an S-SSB as a criterion for selecting a synchronization source, based on that at least one of a first synchronization source or a second synchronization source transmits a synchronization signal to a first UE based on GNSS.

For example, in case that a plurality of first synchronization sources including a first synchronization source transmits a synchronization signal to a first UE based on GNSS, and a plurality of second synchronization sources including a second synchronization source transmits a synchronization signal that is not based on GNSS (hereinafter, non-GNSS) to a first UE, a first UE may select any one GNSS-based representative synchronization source from among a plurality of first synchronization sources based on RSRP related to an S-SSB, and a first UE may select any one non-GNSS-based representative synchronization source from among a plurality of second synchronization sources based on an SLSS-ID related to an S-SSB. A first UE may select either a GNSS-based representative synchronization source or a non-GNSS-based representative synchronization source based on RSRP related to an S-SSB. For example, a first UE may select a synchronization source having a larger RSRP value related to S-SSB among a GNSS-based representative synchronization source or anon-GNSS-based representative synchronization source.

For example, in the examples above, even when a synchronization source determined as a current reference synchronization exists, a first UE may newly select or change a synchronization source from among a synchronization source determined as a current reference synchronization, a first synchronization source, and a second synchronization source.

In step S1430, a first UE may perform sidelink communication with a second UE based on a selected synchronization source.

Figure 15:
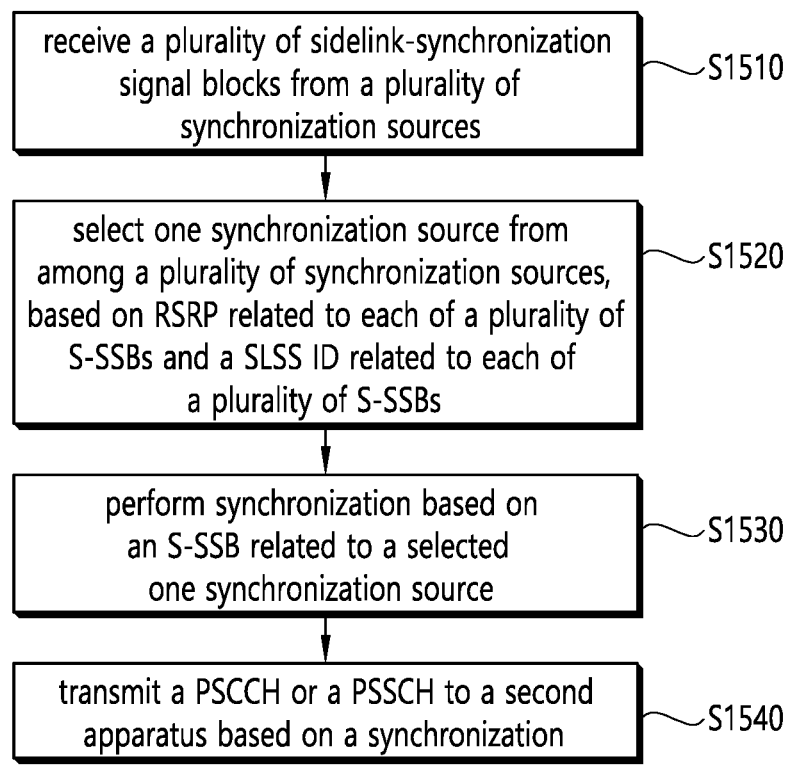
FIG. 15 shows a method for a first apparatus to select one of a plurality of synchronization sources as a synchronization source, according to an embodiment of the present disclosure.

FIG. 15 shows a method for a first apparatus to select one of a plurality of synchronization sources as a synchronization source, according to an embodiment of the present disclosure. The embodiment of FIG. 15 may be combined with various embodiments of the present disclosure.

Referring to FIG. 15, in step S1510, a first apparatus 100 may receive a plurality of sidelink-synchronization signal blocks (S-SSBs) from a plurality of synchronization sources. For example, each of the plurality of S-SSBs may include a sidelink primary synchronization signal (S-PSS), a sidelink secondary synchronization signal (S-SSS), and a physical sidelink broadcast channel (PSBCH).

In step S1520, a first apparatus 100 may select one synchronization source from among the plurality of synchronization sources, based on reference signal received power (RSRP) related to each of the plurality of S-SSBs and a sidelink synchronization signal (SLSS) ID related to each of the plurality of S-SSBs.

For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold. For example, a synchronization source with the smallest SLSS ID value related to each of the plurality of S-SSBs may be selected.

For example, an SLSS ID related to each of the plurality of S-SSBs may become a criterion for selecting one synchronization source from among the plurality of synchronization sources, based on that a difference value between RSRP related to each of the plurality of S-SSBs is less than a first threshold value. For example, RSRP related to each of the plurality of S-SSBs may become a criterion for selecting any one synchronization source from among the plurality of synchronization sources, based on that the difference value between RSRP related to each of the plurality of S-SSBs is greater than or equal to the first threshold value.

For example, an SLSS ID related to each of the plurality of S-SSBs may become a criterion for selecting one synchronization source from among the plurality of synchronization sources, based on that a priority value related to each of the plurality of synchronization sources is the same and RSRP related to each of the plurality of S-SSBs is greater than or equal to a minimum RSRP threshold. For example, a synchronization source with an SLSS ID value related to each of the plurality of S-SSBs closest to a pre-configured value may be selected.

For example, an SLSS ID related to each of the plurality of S-SSBs may become a criterion for selecting one synchronization source from among the plurality of synchronization sources, based on that a priority value related to each of the plurality of synchronization sources is less than or equal to a pre-configured priority value.

For example, RSRP related to each of the plurality of S-SSBs may become a criterion for selecting any one synchronization source from among the plurality of synchronization sources, based on that a priority value related to each of the plurality of synchronization sources is greater than a pre-configured priority value.

For example, one of an SLSS ID related to each of the plurality of S-SSBs or RSRP related to each of the plurality of S-SSBs may be pre-configured by higher layer signaling, as a criterion for selecting one synchronization source from among the plurality of synchronization sources.

For example, an SLSS ID related to each of the plurality of S-SSBs may become a criterion for selecting one synchronization source from among the plurality of synchronization sources, based on that a difference value between RSRP related to each of the plurality of S-SSBs is less than a first threshold value, and that the difference value between the RSRPs related to each of the plurality of S-SSBs is maintained shorter than a pre-configured time.

For example, RSRP related to each of the plurality of S-SSBs may become a criterion for selecting any one synchronization source from among the plurality of synchronization sources, based on that a difference value between RSRP related to each of the plurality of S-SSBs is greater than or equal to a first threshold value, and that the difference value between the RSRPs related to each of the plurality of S-SSBs is maintained longer than a pre-configured time.

For example, SLSS ID related to each of the plurality of S-SSBs becomes a criterion for selecting one synchronization source from among the plurality of synchronization sources, based on that a difference value of SLSS ID value related to each of the plurality of S-SSBs is greater than or equal to a second threshold value.

For example, RSRP related to each of the plurality of S-SSBs may be a criterion for selecting one synchronization source among the plurality of synchronization sources, based on that the plurality of synchronization sources transmits a synchronization signal based on GNSS.

For example, a criterion for selecting one synchronization source from among the plurality of synchronization sources may be determined as one of RSRP related to each of the plurality of S-SSBs or an SLSS ID related to each of the plurality of S-SSBs, based on whether a priority related to synchronization source selection has a priority related to GNSS.

For example, the plurality of synchronization sources may include a plurality of first synchronization sources that transmit a synchronization signal based on GNSS and a plurality of second synchronization sources that transmit a synchronization signal that is not based on GNSS. For example, one first synchronization source may be selected from among the plurality of first synchronization sources based on RSRP related to each of the plurality of first synchronization sources. For example, one second synchronization source may be selected from among the plurality of second synchronization sources based on an SLSS ID related to each of the plurality of second synchronization sources. For example, one of the selected first synchronization source or the selected second synchronization source may be selected as a synchronization source based on RSRP related to the selected first synchronization source and RSRP related to the selected second synchronization source.

In step S1530, a first apparatus 100 may perform synchronization based on an S-SSB related to the selected one synchronization source. In step S1540, a first apparatus 100 may transmit a physical sidelink control channel (PSCCH) or a physical sidelink shared channel (PSSCH) to a second apparatus 200 based on the synchronization.

The above-described embodiment can be applied to various apparatuses to be described below. For example, a processor 102 of a first apparatus 100 may control a transceiver 106 to receive a plurality of sidelink-synchronization signal blocks (S-SSBs) from a plurality of synchronization sources. And, a processor 102 of a first apparatus 100 may select one synchronization source from among the plurality of synchronization sources, based on reference signal received power (RSRP) related to each of the plurality of S-SSBs and a sidelink synchronization signal (SLSS) ID related to each of the plurality of S-SSBs. And, a processor 102 of a first apparatus 100 may perform synchronization based on an S-SSB related to the selected one synchronization source. And, a processor 102 of a first apparatus 100 may control a transceiver 106 to transmit a physical sidelink control channel (PSCCH) or a physical sidelink shared channel (PSSCH) to a second apparatus 200 based on the synchronization.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: receive a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); select one synchronization source from among the plurality of synchronization sources, based on reference signal received power (RSRP) related to each of the plurality of S-SSBs and a sidelink synchronization signal (SLSS) ID related to each of the plurality of S-SSBs; perform synchronization based on an S-SSB related to the selected one synchronization source; and transmit a physical sidelink control channel (PSCCH) or a physical sidelink shared channel (PSSCH) to a second apparatus based on the synchronization. For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); select one synchronization source from among the plurality of synchronization sources, based on reference signal received power (RSRP) related to each of the plurality of S-SSBs and a sidelink synchronization signal (SLSS) ID related to each of the plurality of S-SSBs; perform synchronization based on an S-SSB related to the selected one synchronization source; and transmit a physical sidelink control channel (PSCCH) or a physical sidelink shared channel (PSSCH) to a second UE based on the synchronization. For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold.

According to an embodiment of the present disclosure, a non-transitory computer-readable storage medium storing instructions may be proposed. For example, the instructions, when executed, may cause a first apparatus to: receive a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); select one synchronization source from among the plurality of synchronization sources, based on reference signal received power (RSRP) related to each of the plurality of S-SSBs and a sidelink synchronization signal (SLSS) ID related to each of the plurality of S-SSBs; perform synchronization based on an S-SSB related to the selected one synchronization source; and transmit a physical sidelink control channel (PSCCH) or a physical sidelink shared channel (PSSCH) to a second apparatus based on the synchronization. For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold.

Figure 16:
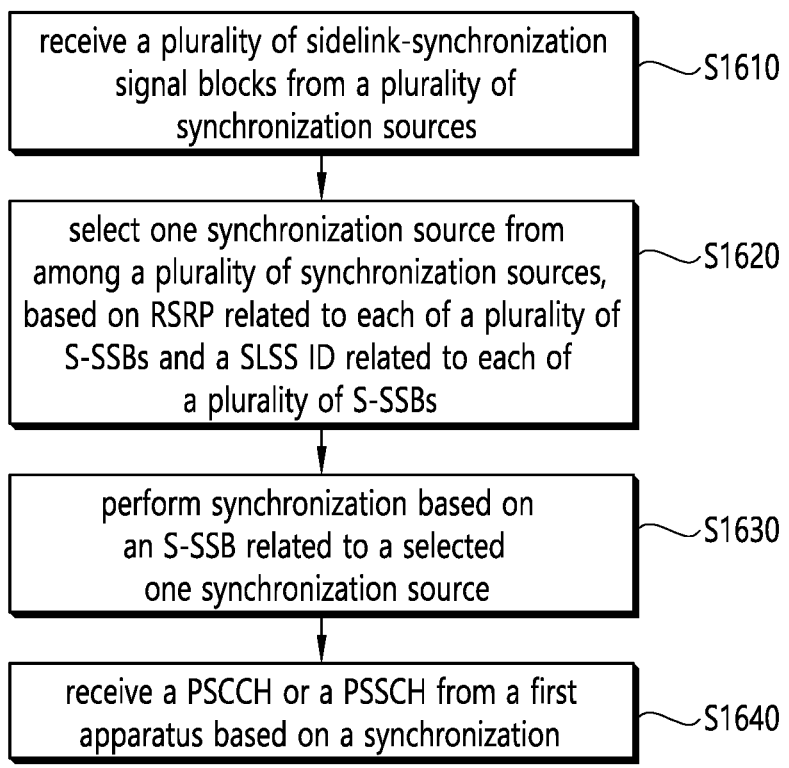
FIG. 16 shows a method for a second apparatus to perform sidelink communication with a first apparatus by performing synchronization with a selected synchronization source, according to an embodiment of the present disclosure.

FIG. 16 shows a method for a second apparatus to perform sidelink communication with a first apparatus by performing synchronization with a selected synchronization source, according to an embodiment of the present disclosure. The embodiment of FIG. 16 may be combined with various embodiments of the present disclosure.

Referring to FIG. 16, in step S1610, a second apparatus 200 may receive a plurality of sidelink-synchronization signal blocks (S-SSBs) from a plurality of synchronization sources. For example, each of the plurality of S-SSBs may include a sidelink primary synchronization signal (S-PSS), a sidelink secondary synchronization signal (S-SSS), and a physical sidelink broadcast channel (PSBCH).

In step S1620, a second apparatus 200 may select one synchronization source from among the plurality of synchronization sources, based on reference signal received power (RSRP) related to each of the plurality of S-SSBs and a sidelink synchronization signal (SLSS) ID related to each of the plurality of S-SSBs.

For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold. For example, a synchronization source with the smallest SLSS ID value related to each of the plurality of S-SSBs may be selected.

For example, an SLSS ID related to each of the plurality of S-SSBs may become a criterion for selecting one synchronization source from among the plurality of synchronization sources, based on that a difference value between RSRP related to each of the plurality of S-SSBs is less than a first threshold value. For example, RSRP related to each of the plurality of S-SSBs may become a criterion for selecting any one synchronization source from among the plurality of synchronization sources, based on that the difference value between RSRP related to each of the plurality of S-SSBs is greater than or equal to the first threshold value.

For example, an SLSS ID related to each of the plurality of S-SSBs may become a criterion for selecting one synchronization source from among the plurality of synchronization sources, based on that a priority value related to each of the plurality of synchronization sources is the same and RSRP related to each of the plurality of S-SSBs is greater than or equal to a minimum RSRP threshold. For example, a synchronization source with an SLSS ID value related to each of the plurality of S-SSBs closest to a pre-configured value may be selected.

For example, an SLSS ID related to each of the plurality of S-SSBs may become a criterion for selecting one synchronization source from among the plurality of synchronization sources, based on that a priority value related to each of the plurality of synchronization sources is less than or equal to a pre-configured priority value.

For example, RSRP related to each of the plurality of S-SSBs may become a criterion for selecting any one synchronization source from among the plurality of synchronization sources, based on that a priority value related to each of the plurality of synchronization sources is greater than a pre-configured priority value.

For example, one of an SLSS ID related to each of the plurality of S-SSBs or RSRP related to each of the plurality of S-SSBs may be pre-configured by higher layer signaling, as a criterion for selecting one synchronization source from among the plurality of synchronization sources.

For example, an SLSS ID related to each of the plurality of S-SSBs may become a criterion for selecting one synchronization source from among the plurality of synchronization sources, based on that a difference value between RSRP related to each of the plurality of S-SSBs is less than a first threshold value, and that the difference value between the RSRPs related to each of the plurality of S-SSBs is maintained shorter than a pre-configured time.

For example, RSRP related to each of the plurality of S-SSBs may become a criterion for selecting any one synchronization source from among the plurality of synchronization sources, based on that a difference value between RSRP related to each of the plurality of S-SSBs is greater than or equal to a first threshold value, and that the difference value between the RSRPs related to each of the plurality of S-SSBs is maintained longer than a pre-configured time.

For example, SLSS ID related to each of the plurality of S-SSBs becomes a criterion for selecting one synchronization source from among the plurality of synchronization sources, based on that a difference value of SLSS ID value related to each of the plurality of S-SSBs is greater than or equal to a second threshold value.

For example, RSRP related to each of the plurality of S-SSBs may be a criterion for selecting one synchronization source among the plurality of synchronization sources, based on that the plurality of synchronization sources transmits a synchronization signal based on GNSS.

For example, a criterion for selecting one synchronization source from among the plurality of synchronization sources may be determined as one of RSRP related to each of the plurality of S-SSBs or an SLSS ID related to each of the plurality of S-SSBs, based on whether a priority related to synchronization source selection has a priority related to GNSS.

For example, the plurality of synchronization sources may include a plurality of first synchronization sources that transmit a synchronization signal based on GNSS and a plurality of second synchronization sources that transmit a synchronization signal that is not based on GNSS. For example, one first synchronization source may be selected from among the plurality of first synchronization sources based on RSRP related to each of the plurality of first synchronization sources. For example, one second synchronization source may be selected from among the plurality of second synchronization sources based on an SLSS ID related to each of the plurality of second synchronization sources. For example, one of the selected first synchronization source or the selected second synchronization source may be selected as a synchronization source based on RSRP related to the selected first synchronization source and RSRP related to the selected second synchronization source.

In step S1630, a second apparatus 200 may perform synchronization based on an S-SSB related to the selected one synchronization source. In step S1640, a second apparatus 200 may receive a physical sidelink control channel (PSCCH) or a physical sidelink shared channel (PSSCH) from a first apparatus 100 based on the synchronization.

The above-described embodiment may be applied to various apparatuses to be described below. For example, a processor 202 of a second apparatus 200 may control a transceiver 206 to receive a plurality of sidelink-synchronization signal blocks (S-SSBs) from a plurality of synchronization sources. And, a processor 202 of a second apparatus 200 may select one synchronization source from among the plurality of synchronization sources, based on reference signal received power (RSRP) related to each of the plurality of S-SSBs and a sidelink synchronization signal (SLSS) ID related to each of the plurality of S-SSBs. And, a processor 202 of a second apparatus 200 may perform synchronization based on an S-SSB related to the selected one synchronization source. And, a processor 202 of a second apparatus 200 may control a transceiver 206 to receive a physical sidelink control channel (PSCCH) or a physical sidelink shared channel (PSSCH) from a first apparatus 100 based on the synchronization.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive a plurality of sidelink-synchronization signal blocks (S-SSBs) from a plurality of synchronization sources, wherein each of the plurality of S-SSBs includes a sidelink primary synchronization signal (S-PSS), a sidelink secondary synchronization signal (S-SSS), and a physical sidelink broadcast channel (PSBCH); select one synchronization source from among the plurality of synchronization sources, based on reference signal received power (RSRP) related to each of the plurality of S-SSBs and a sidelink synchronization signal (SLSS) ID related to each of the plurality of S-SSBs; perform synchronization based on an S-SSB related to the selected one synchronization source; and receive a physical sidelink control channel (PSCCH) or a physical sidelink shared channel (PSSCH) from a first apparatus based on the synchronization. For example, an SLSS ID related to each of the plurality of S-SSBs may become a criterion for selecting one synchronization source from among the plurality of synchronization sources, based on that an RSRP value related to each of the plurality of S-SSBs is greater than or equal to a minimum RSRP threshold.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
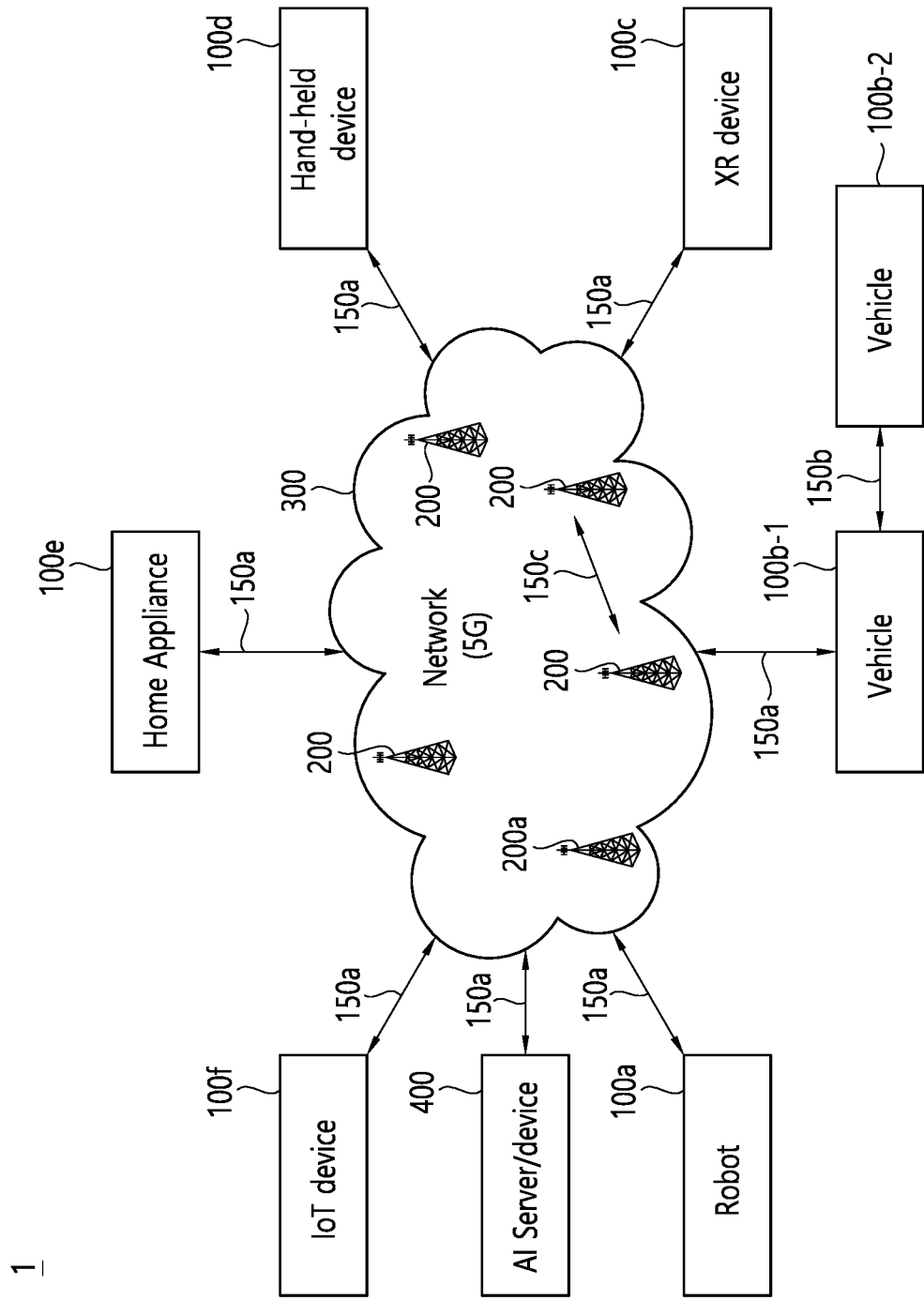
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
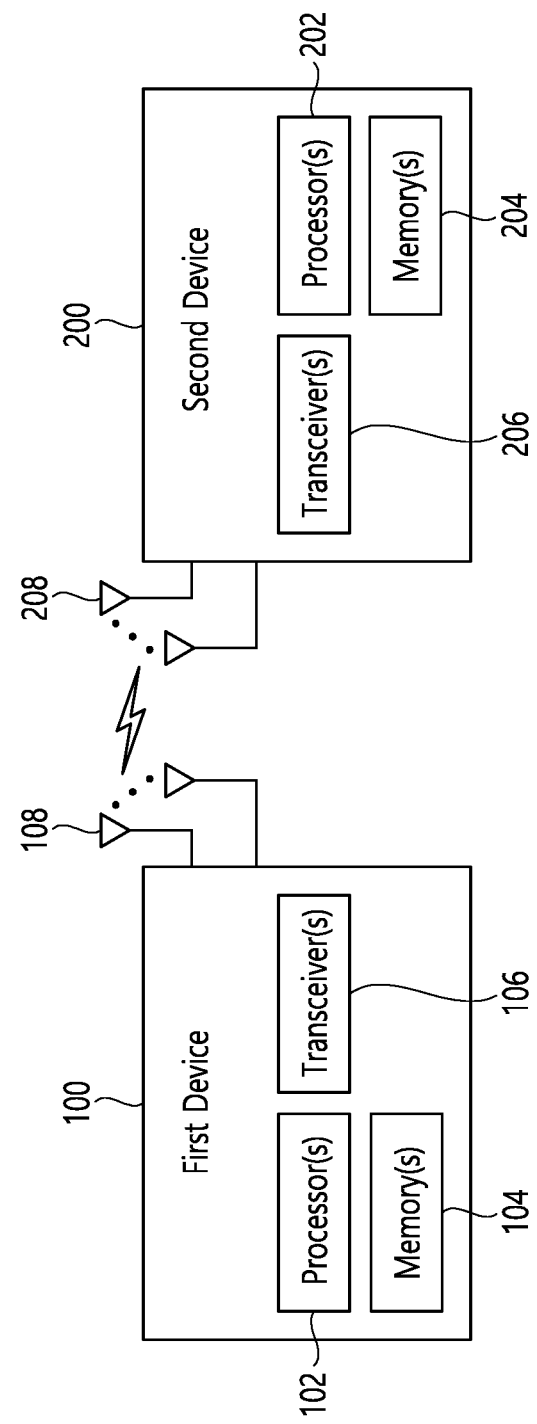
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
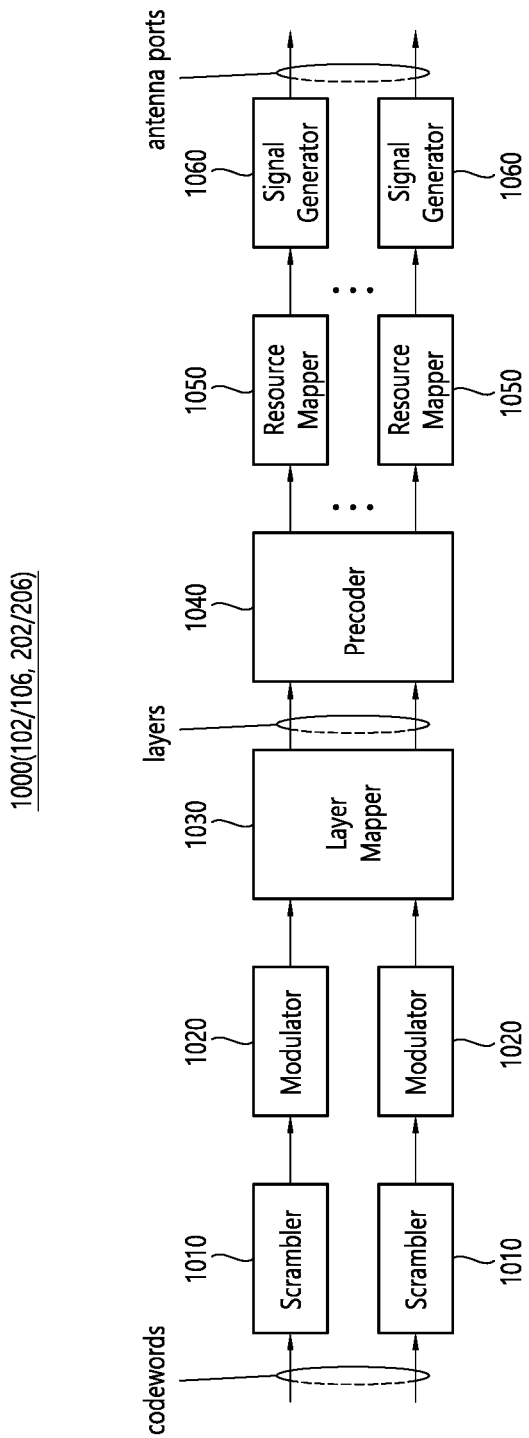
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols)

in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
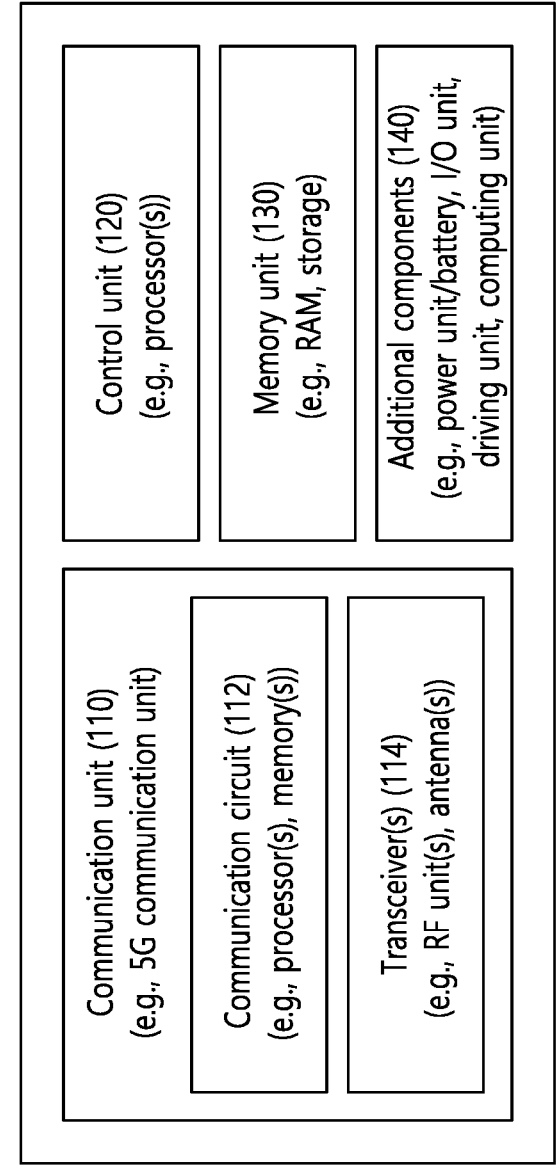
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
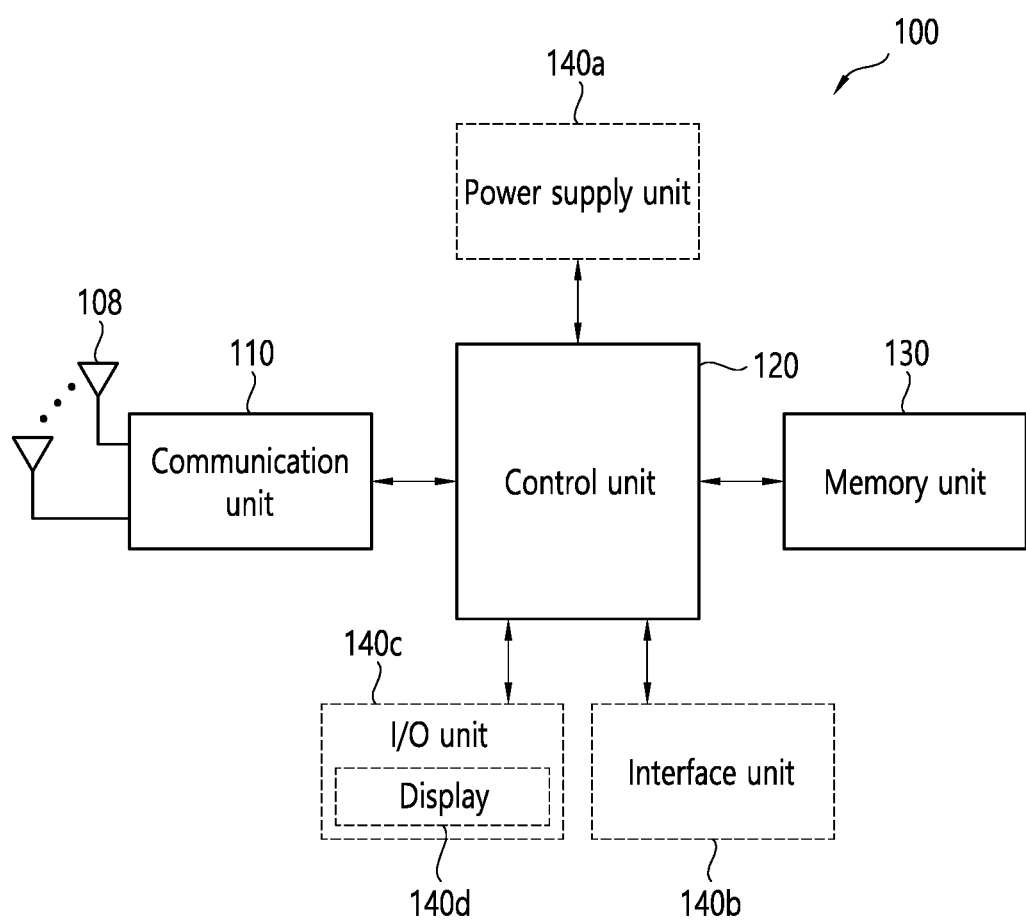
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 22:
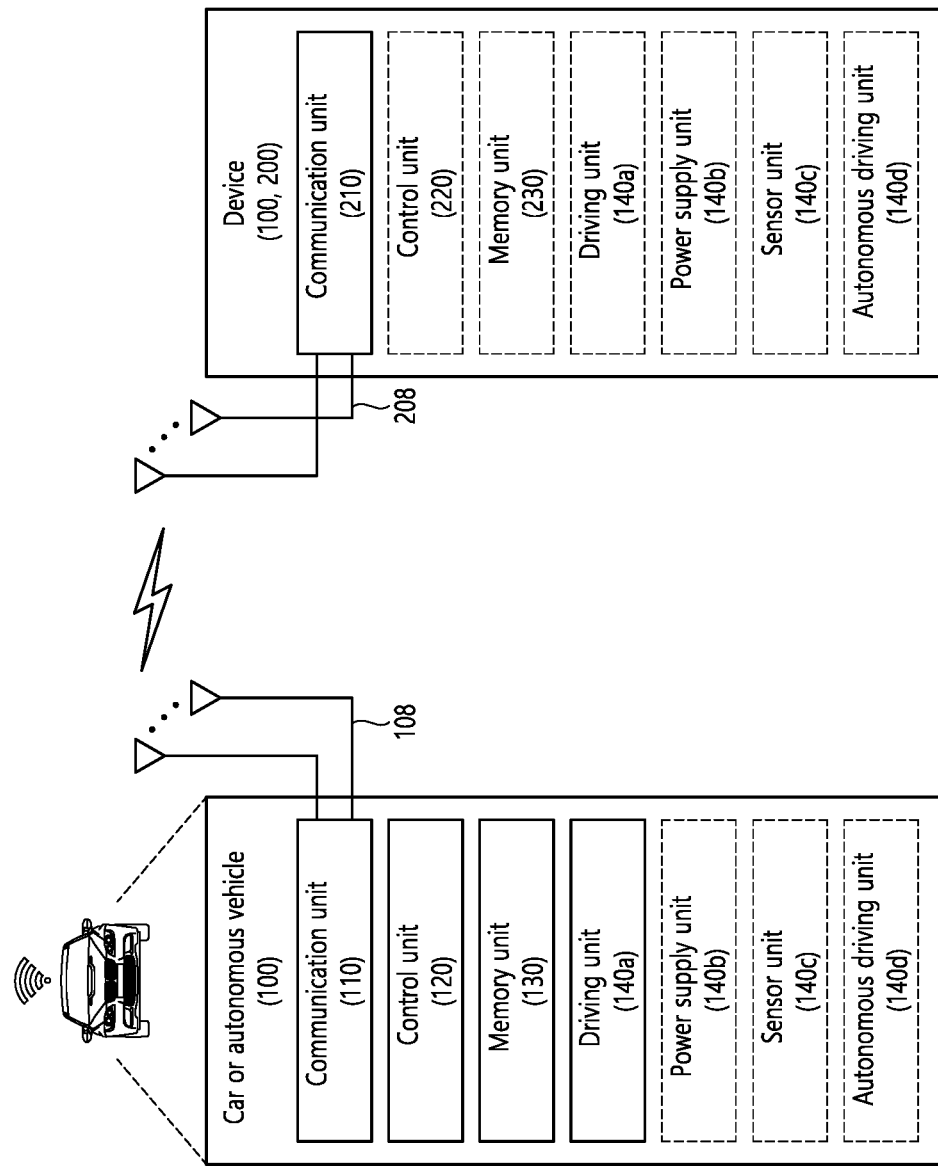
FIG. 22 shows a car or an autonomous vehicle, in accordance with an embodiment of the present disclosure.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    receiving a plurality of sidelink-synchronization signal blocks (S-SSBs) from a plurality of synchronization sources,
    wherein the plurality of synchronization sources includes a plurality of first synchronization sources that transmit a synchronization signal based on global navigation satellite system (GNSS) and a plurality of second synchronization sources that transmit a synchronization signal that is not based on GNSS;
    selecting a first representative synchronization source from among the plurality of first synchronization sources based on reference signal received power (RSRP) related to each of the plurality of first synchronization sources;
    selecting a second representative synchronization source from among the plurality of second synchronization sources based on a sidelink synchronization signal (SLSS) identifier (ID) related to each of the plurality of second synchronization sources;
    selecting one synchronization source from among the selected first representative synchronization source and the selected second representative synchronization source based on RSRP related to the selected first representative synchronization source and RSRP related to the selected second representative synchronization source;
    performing synchronization based on an S-SSB related to the selected one synchronization source; and
    transmitting a physical sidelink control channel (PSCCH) or a physical sidelink shared channel (PSSCH) to a second apparatus based on the synchronization,
    wherein an SLSS ID related to each of the plurality of S-SSBs becomes a criterion for selecting one synchronization source from among the plurality of synchronization sources, based on that an RSRP value related to each of the plurality of S-SSBs is greater than or equal to a minimum RSRP threshold.

2. The method of claim 1, wherein an SLSS ID related to each of the plurality of S-SSBs becomes a criterion for selecting one synchronization source from among the plurality of synchronization sources, based on that a difference value between RSRP related to each of the plurality of S-SSBs is less than a first threshold value, and wherein RSRP related to each of the plurality of S-SSBs becomes a criterion for selecting any one synchronization source from among the plurality of synchronization sources, based on that the difference value between RSRP related to each of the plurality of S-SSBs is greater than or equal to the first threshold value.

3. The method of claim 1, wherein an SLSS ID related to each of the plurality of S-SSBs becomes a criterion for selecting one synchronization source from among the plurality of synchronization sources, based on that a priority value related to each of the plurality of synchronization sources is the same and RSRP related to each of the plurality of S-SSBs is greater than or equal to a minimum RSRP threshold.

4. The method of claim 1, wherein an SLSS ID related to each of the plurality of S-SSBs becomes a criterion for selecting one synchronization source from among the plurality of synchronization sources, based on that a priority value related to each of the plurality of synchronization sources is less than or equal to a pre-configured priority value.

5. The method of claim 1, wherein RSRP related to each of the plurality of S-SSBs becomes a criterion for selecting any one synchronization source from among the plurality of synchronization sources, based on that a priority value related to each of the plurality of synchronization sources is greater than a pre-configured priority value.

6. The method of claim 1, wherein one of an SLSS ID related to each of the plurality of S-SSBs or RSRP related to each of the plurality of S-SSBs is pre-configured by higher layer signaling, as a criterion for selecting one synchronization source from among the plurality of synchronization sources.

7. The method of claim 1, wherein an SLSS ID related to each of the plurality of S-SSBs becomes a criterion for selecting one synchronization source from among the plurality of synchronization sources, based on that a difference value between RSRP related to each of the plurality of S-SSBs is less than a first threshold value, and that the difference value between the RSRPs related to each of the plurality of S-SSBs is maintained shorter than a pre-configured time.

8. The method of claim 1, wherein RSRP related to each of the plurality of S-SSBs becomes a criterion for selecting any one synchronization source from among the plurality of synchronization sources, based on that a difference value between RSRP related to each of the plurality of S-SSBs is greater than or equal to a first threshold value, and that the difference value between the RSRPs related to each of the plurality of S-SSBs is maintained longer than a pre-configured time.

9. The method of claim 1, wherein SLSS ID related to each of the plurality of S-SSBs becomes a criterion for selecting one synchronization source from among the plurality of synchronization sources, based on that a difference value of SLSS ID value related to each of the plurality of S-SSBs is greater than or equal to a second threshold value.

10. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
receive a plurality of sidelink-synchronization signal blocks (S-SSBs) from a plurality of synchronization sources,
wherein the plurality of synchronization sources includes a plurality of first synchronization sources that transmit a synchronization signal based on global navigation satellite system (GNSS) and a plurality of second synchronization sources that transmit a synchronization signal that is not based on GNSS;
select a first representative synchronization source from among the plurality of first synchronization sources based on reference signal received power (RSRP) related to each of the plurality of first synchronization sources;
select a second representative synchronization source from among the plurality of second synchronization sources based on a sidelink synchronization signal (SLSS) identifier (ID) related to each of the plurality of second synchronization sources;
select one synchronization source from among the selected first representative synchronization source and the selected second representative synchronization source based on RSRP related to the selected first representative synchronization source and RSRP related to the selected second representative synchronization source;
perform synchronization based on an S-SSB related to the selected one synchronization source; and
transmit a physical sidelink control channel (PSCCH) or a physical sidelink shared channel (PSSCH) to a second apparatus based on the synchronization,
wherein an SLSS ID related to each of the plurality of S-SSBs becomes a criterion for selecting one synchronization source from among the plurality of synchronization sources, based on that an RSRP value related to each of the plurality of S-SSBs is greater than or equal to a minimum RSRP threshold.

11. An apparatus configured to control a first user equipment (UE), the apparatus comprising:
one or more processors; and
one or more memories operably connectable to the one or more processors and storing instructions, wherein the one or more processors execute the instructions to:
receive a plurality of sidelink-synchronization signal blocks (S-SSBs) from a plurality of synchronization sources,
wherein the plurality of synchronization sources includes a plurality of first synchronization sources that transmit a synchronization signal based on global navigation satellite system (GNSS) and a plurality of second synchronization sources that transmit a synchronization signal that is not based on GNSS;
select a first representative synchronization source from among the plurality of first synchronization sources based on reference signal received power (RSRP) related to each of the plurality of first synchronization sources;
select a second representative synchronization source from among the plurality of second synchronization sources based on a sidelink synchronization signal (SLSS) identifier (ID) related to each of the plurality of second synchronization sources;
select one synchronization source from among the selected first representative synchronization source and the selected second representative synchronization source based on RSRP related to the selected first representative synchronization source and RSRP related to the selected second representative synchronization source;

perform synchronization based on an S-SSB related to the selected one synchronization source; and
transmit a physical sidelink control channel (PSCCH) or a physical sidelink shared channel (PSSCH) to a second UE based on the synchronization,
wherein an SLSS ID related to each of the plurality of S-SSBs becomes a criterion for selecting one synchronization source from among the plurality of synchronization sources, based on that an RSRP value related to each of the plurality of S-SSBs is greater than or equal to a minimum RSRP threshold.

* * * * *